US011817083B2

(12) United States Patent
Tolomei et al.

(10) Patent No.: US 11,817,083 B2
(45) Date of Patent: Nov. 14, 2023

(54) NETWORKED MICROPHONE DEVICES, SYSTEMS, AND METHODS OF LOCALIZED ARBITRATION

(71) Applicant: Sonos, Inc., Santa Barbara, CA (US)

(72) Inventors: John Tolomei, Renton, WA (US); Klaus Hartung, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/145,520

(22) Filed: Dec. 22, 2022

(65) Prior Publication Data

US 2023/0215424 A1   Jul. 6, 2023

Related U.S. Application Data

(63) Continuation of application No. 17/486,574, filed on Sep. 27, 2021, now Pat. No. 11,538,460, which is a
(Continued)

(51) Int. Cl.
*G10L 15/22*   (2006.01)
*G10L 15/08*   (2006.01)
*H04R 3/00*   (2006.01)

(52) U.S. Cl.
CPC .............. *G10L 15/08* (2013.01); *G10L 15/22* (2013.01); *H04R 3/005* (2013.01);
(Continued)

(58) Field of Classification Search
None
See application file for complete search history.

(56) References Cited

U.S. PATENT DOCUMENTS

| 1,999,715 A | 8/1911 | Gundersen |
| 5,717,768 A | 2/1998 | Laroche |

(Continued)

FOREIGN PATENT DOCUMENTS

| CN | 1748250 A | 3/2006 |
| CN | 1781291 A | 5/2006 |

(Continued)

OTHER PUBLICATIONS

Non-Final Office Action dated May 25, 2023, issued in connection with U.S. Appl. No. 18/157,937, filed Jan. 23, 2023, 9 pages.
(Continued)

*Primary Examiner* — Jakieda R Jackson

(57) ABSTRACT

A first playback device is configured to perform functions comprising: detecting sound, identifying a wake word based on the sound as detected by the first device, receiving an indication that a second playback device has also detected the sound and identified the wake word based on the sound as detected by the second device, after receiving the indication, evaluating which of the first and second devices is to extract sound data representing the sound and thereby determining that the extraction of the sound data is to be performed by the second device over the first device, in response to the determining, foregoing extraction of the sound data, receiving VAS response data that is indicative of a given VAS response corresponding to a given voice input identified in the sound data extracted by the second device, and based on the VAS response data, output the given VAS response.

20 Claims, 11 Drawing Sheets

Related U.S. Application Data continuation of application No. 16/219,702, filed on Dec. 13, 2018, now Pat. No. 11,132,989.

(52) U.S. Cl.
CPC .. *G10L 2015/088* (2013.01); *G10L 2015/223* (2013.01); *G10L 2015/226* (2013.01)

(56) References Cited

U.S. PATENT DOCUMENTS

| | | | |
|---|---|---|---|
| 5,857,172 A | 1/1999 | Rozak | |
| 6,070,140 A | 5/2000 | Tran | |
| 6,219,645 B1 | 4/2001 | Byers | |
| 6,937,977 B2 | 8/2005 | Gerson | |
| 7,103,542 B2 | 9/2006 | Doyle | |
| 7,516,068 B1 | 4/2009 | Clark | |
| 7,705,565 B2 | 4/2010 | Patino et al. | |
| 8,085,947 B2 | 12/2011 | Haulick et al. | |
| 8,233,632 B1 | 7/2012 | Macdonald et al. | |
| 8,325,909 B2 | 12/2012 | Tashev et al. | |
| 8,473,618 B2 | 6/2013 | Spear et al. | |
| 8,594,320 B2 | 11/2013 | Faller | |
| 8,620,232 B2 | 12/2013 | Helsloot | |
| 8,639,214 B1 | 1/2014 | Fujisaki | |
| 8,676,273 B1 | 3/2014 | Fujisaki | |
| 8,762,156 B2 | 6/2014 | Chen | |
| 8,768,712 B1* | 7/2014 | Sharifi | G10L 15/22 704/270.1 |
| 8,898,063 B1 | 11/2014 | Sykes et al. | |
| 9,002,024 B2 | 4/2015 | Nakadai et al. | |
| 9,047,857 B1 | 6/2015 | Barton | |
| 9,070,367 B1 | 6/2015 | Hoffmeister et al. | |
| 9,088,336 B2 | 7/2015 | Mani et al. | |
| 9,098,467 B1 | 8/2015 | Blanksteen et al. | |
| 9,183,845 B1 | 11/2015 | Gopalakrishnan et al. | |
| 9,208,785 B2 | 12/2015 | Ben-David et al. | |
| 9,313,317 B1 | 4/2016 | Lebeau et al. | |
| 9,354,687 B2 | 5/2016 | Bansal et al. | |
| 9,368,105 B1 | 6/2016 | Freed et al. | |
| 9,491,033 B1 | 11/2016 | Soyannwo et al. | |
| 9,514,747 B1 | 12/2016 | Bisani et al. | |
| 9,532,139 B1 | 12/2016 | Lu et al. | |
| 9,542,941 B1 | 1/2017 | Weksler et al. | |
| 9,558,755 B1 | 1/2017 | Laroche et al. | |
| 9,632,748 B2 | 4/2017 | Faaborg et al. | |
| 9,640,194 B1 | 5/2017 | Nemala et al. | |
| 9,672,812 B1 | 6/2017 | Watanabe et al. | |
| 9,691,384 B1 | 6/2017 | Wang et al. | |
| 9,706,320 B2 | 7/2017 | Starobin et al. | |
| 9,749,738 B1 | 8/2017 | Adsumilli et al. | |
| 9,756,422 B2 | 9/2017 | Paquier et al. | |
| 9,767,786 B2 | 9/2017 | Starobin et al. | |
| 9,779,725 B2 | 10/2017 | Sun et al. | |
| 9,781,532 B2 | 10/2017 | Sheen | |
| 9,799,330 B2 | 10/2017 | Nemala et al. | |
| 9,812,128 B2 | 11/2017 | Mixter et al. | |
| 9,818,407 B1 | 11/2017 | Secker-Walker et al. | |
| 9,865,264 B2 | 1/2018 | Gelfenbeyn et al. | |
| 9,875,740 B1 | 1/2018 | Kumar et al. | |
| 9,898,250 B1 | 2/2018 | Williams et al. | |
| 9,899,021 B1 | 2/2018 | Vitaladevuni et al. | |
| 9,972,343 B1 | 5/2018 | Thorson et al. | |
| 9,992,642 B1 | 6/2018 | Rapp et al. | |
| 10,028,069 B1 | 7/2018 | Lang | |
| 10,038,419 B1 | 7/2018 | Elliot et al. | |
| 10,115,400 B2 | 10/2018 | Wilberding | |
| 10,134,398 B2 | 11/2018 | Sharifi | |
| 10,134,399 B2 | 11/2018 | Lang et al. | |
| 10,152,969 B2 | 12/2018 | Reilly et al. | |
| 10,157,042 B1* | 12/2018 | Jayakumar | H04R 27/00 |
| 10,186,276 B2 | 1/2019 | Dewasurendra et al. | |
| 10,204,624 B1 | 2/2019 | Knudson et al. | |
| 10,249,205 B2 | 4/2019 | Hammersley et al. | |
| 10,304,440 B1 | 5/2019 | Panchapagesan et al. | |
| 10,304,475 B1 | 5/2019 | Wang et al. | |
| 10,318,236 B1 | 6/2019 | Pal et al. | |
| 10,332,508 B1 | 6/2019 | Hoffmeister | |
| 10,354,658 B2 | 7/2019 | Wilberding | |
| 10,424,296 B2 | 9/2019 | Penilla et al. | |
| 10,565,999 B2 | 1/2020 | Wilberding | |
| 10,565,998 B2 | 2/2020 | Wilberding | |
| 10,586,534 B1 | 3/2020 | Argyropoulos et al. | |
| 10,593,328 B1 | 3/2020 | Wang et al. | |
| 10,593,330 B2 | 3/2020 | Sharifi | |
| 10,699,711 B2 | 6/2020 | Reilly | |
| 10,720,173 B2 | 7/2020 | Freeman et al. | |
| 10,735,870 B2 | 8/2020 | Ballande et al. | |
| 10,746,840 B1 | 8/2020 | Barton et al. | |
| 10,777,203 B1 | 9/2020 | Pasko | |
| 10,789,041 B2 | 9/2020 | Kim et al. | |
| 10,824,682 B2 | 11/2020 | Alvares et al. | |
| 10,825,471 B2 | 11/2020 | Walley et al. | |
| 10,837,667 B2 | 11/2020 | Nelson et al. | |
| 10,847,137 B1 | 11/2020 | Mandal et al. | |
| 10,847,164 B2 | 11/2020 | Wilberding | |
| 10,867,604 B2 | 12/2020 | Smith et al. | |
| 10,871,943 B1 | 12/2020 | D'Amato et al. | |
| 10,878,811 B2 | 12/2020 | Smith et al. | |
| 10,964,314 B2 | 3/2021 | Jazi et al. | |
| 11,024,311 B2 | 6/2021 | Mixter et al. | |
| 11,025,569 B2 | 6/2021 | Lind et al. | |
| 11,050,615 B2 | 6/2021 | Mathews et al. | |
| 11,062,705 B2 | 7/2021 | Watanabe et al. | |
| 11,100,923 B2 | 8/2021 | Fainberg et al. | |
| 11,137,979 B2 | 10/2021 | Plagge | |
| 11,138,969 B2 | 10/2021 | D'Amato | |
| 11,159,878 B1 | 10/2021 | Chatlani et al. | |
| 11,172,328 B2 | 11/2021 | Soto et al. | |
| 11,172,329 B2 | 11/2021 | Soto et al. | |
| 11,175,880 B2 | 11/2021 | Liu et al. | |
| 11,184,704 B2 | 11/2021 | Jarvis et al. | |
| 11,206,052 B1 | 12/2021 | Park et al. | |
| 11,212,612 B2 | 12/2021 | Lang et al. | |
| 11,264,019 B2 | 3/2022 | Bhattacharya et al. | |
| 11,277,512 B1 | 3/2022 | Leeds et al. | |
| 11,315,556 B2 | 4/2022 | Smith et al. | |
| 11,354,092 B2 | 6/2022 | D'Amato et al. | |
| 11,361,763 B1 | 6/2022 | Maas et al. | |
| 11,373,645 B1 | 6/2022 | Mathew et al. | |
| 11,411,763 B2 | 8/2022 | Mackay et al. | |
| 11,445,301 B2 | 9/2022 | Park et al. | |
| 11,514,898 B2 | 11/2022 | Millington | |
| 11,531,520 B2 | 11/2022 | Wilberding | |
| 11,538,460 B2 | 12/2022 | Tolomei | |
| 2002/0054685 A1 | 5/2002 | Avendano et al. | |
| 2002/0055950 A1 | 5/2002 | Witteman | |
| 2002/0143532 A1 | 10/2002 | McLean et al. | |
| 2003/0097482 A1* | 5/2003 | DeHart | H04L 61/50 709/253 |
| 2004/0093219 A1 | 5/2004 | Shin et al. | |
| 2004/0153321 A1 | 8/2004 | Chung et al. | |
| 2004/0161082 A1 | 8/2004 | Brown et al. | |
| 2007/0033043 A1 | 2/2007 | Hyakumoto | |
| 2007/0038461 A1 | 2/2007 | Abbott et al. | |
| 2007/0201639 A1 | 8/2007 | Park et al. | |
| 2008/0008333 A1 | 1/2008 | Nishikawa et al. | |
| 2008/0031466 A1 | 2/2008 | Buck et al. | |
| 2008/0160977 A1 | 7/2008 | Ahmaniemi et al. | |
| 2008/0192946 A1 | 8/2008 | Faller | |
| 2008/0221897 A1 | 9/2008 | Cerra et al. | |
| 2008/0291916 A1 | 11/2008 | Xiong et al. | |
| 2009/0013255 A1 | 1/2009 | Yuschik et al. | |
| 2009/0046866 A1 | 2/2009 | Feng et al. | |
| 2009/0113053 A1 | 4/2009 | Van Wie et al. | |
| 2009/0214048 A1 | 8/2009 | Stokes, III et al. | |
| 2009/0299745 A1 | 12/2009 | Kennewick et al. | |
| 2009/0323924 A1 | 12/2009 | Tashev et al. | |
| 2010/0070276 A1 | 3/2010 | Wasserblat et al. | |
| 2010/0179806 A1 | 7/2010 | Zhang et al. | |
| 2010/0260348 A1 | 10/2010 | Bhow et al. | |
| 2010/0278351 A1 | 11/2010 | Fozunbal et al. | |
| 2010/0299639 A1 | 11/2010 | Ramsay et al. | |
| 2010/0329472 A1 | 12/2010 | Nakadai et al. | |
| 2010/0332236 A1 | 12/2010 | Tan | |

(56) References Cited

U.S. PATENT DOCUMENTS

| | | |
|---|---|---|
| 2011/0176687 A1 | 7/2011 | Birkenes |
| 2011/0267985 A1 | 11/2011 | Wilkinson et al. |
| 2012/0009906 A1 | 1/2012 | Patterson et al. |
| 2012/0020485 A1 | 1/2012 | Visser et al. |
| 2012/0027218 A1 | 2/2012 | Every et al. |
| 2012/0076308 A1 | 3/2012 | Kuech et al. |
| 2012/0078635 A1 | 3/2012 | Rothkopf et al. |
| 2012/0224457 A1 | 9/2012 | Kim et al. |
| 2012/0237047 A1 | 9/2012 | Neal et al. |
| 2012/0245941 A1 | 9/2012 | Cheyer |
| 2012/0265528 A1 | 10/2012 | Gruber et al. |
| 2012/0288100 A1 | 11/2012 | Cho |
| 2013/0073293 A1 | 3/2013 | Jang et al. |
| 2013/0080146 A1 | 3/2013 | Kato et al. |
| 2013/0080167 A1 | 3/2013 | Mozer |
| 2013/0080171 A1 | 3/2013 | Mozer et al. |
| 2013/0129100 A1 | 5/2013 | Sorensen |
| 2013/0185639 A1 | 7/2013 | Lim |
| 2013/0230184 A1 | 9/2013 | Kuech et al. |
| 2013/0238326 A1 | 9/2013 | Kim et al. |
| 2013/0283169 A1 | 10/2013 | Van Wie |
| 2013/0289994 A1 | 10/2013 | Newman et al. |
| 2013/0294611 A1 | 11/2013 | Yoo et al. |
| 2013/0301840 A1 | 11/2013 | Yemdji et al. |
| 2013/0322634 A1 | 12/2013 | Bennett et al. |
| 2013/0336499 A1 | 12/2013 | Beckhardt et al. |
| 2013/0339028 A1 | 12/2013 | Rosner et al. |
| 2014/0006825 A1 | 1/2014 | Shenhav |
| 2014/0056435 A1 | 2/2014 | Kjems et al. |
| 2014/0064476 A1 | 3/2014 | Mani et al. |
| 2014/0108010 A1 | 4/2014 | Maltseff et al. |
| 2014/0126745 A1 | 5/2014 | Dickins et al. |
| 2014/0159581 A1 | 6/2014 | Pruemmer et al. |
| 2014/0161263 A1 | 6/2014 | Koishida et al. |
| 2014/0167929 A1* | 6/2014 | Shim ................. G08C 17/02 |
| | | 340/12.5 |
| 2014/0172899 A1 | 6/2014 | Hakkani-Tur et al. |
| 2014/0181199 A1 | 6/2014 | Kumar et al. |
| 2014/0188476 A1 | 7/2014 | Li et al. |
| 2014/0200881 A1 | 7/2014 | Chatlani |
| 2014/0214429 A1 | 7/2014 | Pantel |
| 2014/0229959 A1 | 8/2014 | Beckhardt et al. |
| 2014/0244269 A1 | 8/2014 | Tokutake |
| 2014/0270216 A1 | 9/2014 | Tsilfidis et al. |
| 2014/0274203 A1 | 9/2014 | Ganong, III et al. |
| 2014/0278343 A1 | 9/2014 | Tran |
| 2014/0278445 A1 | 9/2014 | Eddington, Jr. |
| 2014/0288686 A1 | 9/2014 | Sant et al. |
| 2014/0328490 A1 | 11/2014 | Mohammad et al. |
| 2014/0363022 A1 | 12/2014 | Dizon et al. |
| 2014/0364089 A1 | 12/2014 | Lienhart et al. |
| 2014/0365225 A1 | 12/2014 | Haiut |
| 2014/0368734 A1 | 12/2014 | Hoffert et al. |
| 2015/0030172 A1 | 1/2015 | Gaensler et al. |
| 2015/0032443 A1 | 1/2015 | Karov et al. |
| 2015/0032456 A1 | 1/2015 | Wait |
| 2015/0039310 A1 | 2/2015 | Clark et al. |
| 2015/0039311 A1 | 2/2015 | Clark et al. |
| 2015/0073807 A1 | 3/2015 | Kumar |
| 2015/0088500 A1 | 3/2015 | Conliffe |
| 2015/0126255 A1 | 5/2015 | Yang et al. |
| 2015/0154953 A1 | 6/2015 | Bapat et al. |
| 2015/0221307 A1 | 8/2015 | Shah et al. |
| 2015/0373100 A1 | 12/2015 | Kravets et al. |
| 2015/0382128 A1 | 12/2015 | Ridihalgh et al. |
| 2016/0027440 A1 | 1/2016 | Gelfenbeyn et al. |
| 2016/0034448 A1 | 2/2016 | Tran |
| 2016/0055847 A1 | 2/2016 | Dahan |
| 2016/0066087 A1 | 3/2016 | Solbach et al. |
| 2016/0077794 A1 | 3/2016 | Kim et al. |
| 2016/0093281 A1 | 3/2016 | Kuo et al. |
| 2016/0104480 A1* | 4/2016 | Sharifi ................. G10L 17/22 |
| | | 704/254 |
| 2016/0134924 A1 | 5/2016 | Bush et al. |
| 2016/0148612 A1 | 5/2016 | Guo et al. |
| 2016/0155443 A1* | 6/2016 | Khan ................. G06F 3/167 |
| | | 704/275 |
| 2016/0171976 A1 | 6/2016 | Sun et al. |
| 2016/0212488 A1 | 7/2016 | Os et al. |
| 2016/0299737 A1 | 10/2016 | Clayton et al. |
| 2016/0322045 A1 | 11/2016 | Hatfield et al. |
| 2016/0379634 A1 | 12/2016 | Yamamoto et al. |
| 2016/0379635 A1 | 12/2016 | Page |
| 2017/0083606 A1 | 3/2017 | Mohan |
| 2017/0084278 A1 | 3/2017 | Jung |
| 2017/0090864 A1* | 3/2017 | Jorgovanovic ....... H04M 11/007 |
| 2017/0110130 A1 | 4/2017 | Sharifi et al. |
| 2017/0140750 A1 | 5/2017 | Wang et al. |
| 2017/0140757 A1 | 5/2017 | Penilla et al. |
| 2017/0140759 A1 | 5/2017 | Kumar et al. |
| 2017/0164139 A1 | 6/2017 | Deselaers et al. |
| 2017/0186425 A1 | 6/2017 | Dawes et al. |
| 2017/0186427 A1 | 6/2017 | Wang et al. |
| 2017/0236512 A1* | 8/2017 | Williams ................. G06F 3/165 |
| | | 381/79 |
| 2017/0242653 A1 | 8/2017 | Lang et al. |
| 2017/0242656 A1 | 8/2017 | Plagge et al. |
| 2017/0243587 A1 | 8/2017 | Plagge et al. |
| 2017/0245076 A1 | 8/2017 | Kusano et al. |
| 2017/0269900 A1 | 9/2017 | Triplett |
| 2017/0270919 A1 | 9/2017 | Parthasarathi et al. |
| 2017/0300289 A1 | 10/2017 | Gattis |
| 2017/0329397 A1 | 11/2017 | Lin |
| 2017/0357390 A1 | 12/2017 | Alonso Ruiz et al. |
| 2017/0364371 A1 | 12/2017 | Nandi et al. |
| 2017/0365247 A1 | 12/2017 | Ushakov |
| 2018/0012077 A1 | 1/2018 | Laska et al. |
| 2018/0018965 A1 | 1/2018 | Daley |
| 2018/0033429 A1 | 2/2018 | Makke et al. |
| 2018/0040324 A1 | 2/2018 | Wilberding |
| 2018/0061396 A1 | 3/2018 | Srinivasan et al. |
| 2018/0061409 A1 | 3/2018 | Valentine et al. |
| 2018/0061419 A1* | 3/2018 | Melendo Casado .... G10L 25/78 |
| 2018/0061420 A1* | 3/2018 | Patil ................. G10L 17/22 |
| 2018/0091913 A1 | 3/2018 | Hartung et al. |
| 2018/0096678 A1 | 4/2018 | Zhou et al. |
| 2018/0103351 A1* | 4/2018 | Beckhardt ................. G10L 15/32 |
| 2018/0137857 A1 | 5/2018 | Zhou et al. |
| 2018/0139512 A1 | 5/2018 | Moran et al. |
| 2018/0182410 A1 | 6/2018 | Kaskari et al. |
| 2018/0196776 A1 | 7/2018 | Hershko et al. |
| 2018/0199130 A1 | 7/2018 | Jaffe et al. |
| 2018/0204569 A1* | 7/2018 | Nadkar ................. G06F 3/167 |
| 2018/0233137 A1* | 8/2018 | Torok ................. G06F 3/167 |
| 2018/0233141 A1 | 8/2018 | Solomon et al. |
| 2018/0260680 A1 | 9/2018 | Finkelstein et al. |
| 2018/0270573 A1 | 9/2018 | Lang et al. |
| 2018/0270575 A1* | 9/2018 | Akutagawa ............. H04L 67/02 |
| 2018/0277113 A1 | 9/2018 | Hartung et al. |
| 2018/0293221 A1 | 10/2018 | Finkelstein et al. |
| 2018/0301147 A1 | 10/2018 | Kim |
| 2018/0330727 A1 | 11/2018 | Tulli |
| 2018/0336892 A1 | 11/2018 | Kim et al. |
| 2018/0350356 A1 | 12/2018 | Garcia |
| 2018/0350379 A1 | 12/2018 | Wung et al. |
| 2018/0352014 A1 | 12/2018 | Alsina et al. |
| 2018/0352334 A1 | 12/2018 | Family et al. |
| 2018/0358019 A1 | 12/2018 | Mont-Reynaud |
| 2019/0013019 A1* | 1/2019 | Lawrence ................. G10L 15/30 |
| 2019/0019112 A1 | 1/2019 | Gelfenbeyn et al. |
| 2019/0035404 A1 | 1/2019 | Gabel et al. |
| 2019/0037173 A1 | 1/2019 | Lee |
| 2019/0044745 A1 | 2/2019 | Knudson et al. |
| 2019/0066680 A1 | 2/2019 | Woo et al. |
| 2019/0066710 A1 | 2/2019 | Bryan et al. |
| 2019/0073999 A1 | 3/2019 | Prémont et al. |
| 2019/0108839 A1 | 4/2019 | Reilly et al. |
| 2019/0122662 A1 | 4/2019 | Chang et al. |
| 2019/0130906 A1 | 5/2019 | Kobayashi et al. |
| 2019/0156847 A1 | 5/2019 | Bryan et al. |
| 2019/0172452 A1 | 6/2019 | Smith et al. |
| 2019/0172467 A1 | 6/2019 | Kim et al. |
| 2019/0172476 A1 | 6/2019 | Wung et al. |
| 2019/0186937 A1 | 6/2019 | Sharifi et al. |

(56) References Cited

U.S. PATENT DOCUMENTS

| | | |
|---|---|---|
| 2019/0188328 A1 | 6/2019 | Oyenan et al. |
| 2019/0189117 A1 | 6/2019 | Kumar |
| 2019/0206405 A1 | 7/2019 | Gillespie et al. |
| 2019/0206412 A1 | 7/2019 | Li et al. |
| 2019/0237089 A1 | 8/2019 | Shin |
| 2019/0251960 A1 | 8/2019 | Maker et al. |
| 2019/0259408 A1 | 8/2019 | Freeman et al. |
| 2019/0281387 A1 | 9/2019 | Woo et al. |
| 2019/0287536 A1 | 9/2019 | Sharifi et al. |
| 2019/0295555 A1 | 9/2019 | Wilberding |
| 2019/0295556 A1 | 9/2019 | Wilberding |
| 2019/0311715 A1 | 10/2019 | Pfeffinger et al. |
| 2019/0311718 A1 | 10/2019 | Huber et al. |
| 2019/0311722 A1 | 10/2019 | Caldwell |
| 2019/0318729 A1 | 10/2019 | Chao et al. |
| 2019/0325870 A1 | 10/2019 | Mitic |
| 2019/0325888 A1 | 10/2019 | Geng |
| 2019/0341037 A1 | 11/2019 | Bromand et al. |
| 2019/0341038 A1 | 11/2019 | Bromand et al. |
| 2019/0371324 A1 | 12/2019 | Powell et al. |
| 2019/0371342 A1 | 12/2019 | Tukka et al. |
| 2019/0392832 A1 | 12/2019 | Mitsui et al. |
| 2020/0043489 A1 | 2/2020 | Bradley et al. |
| 2020/0110571 A1 | 4/2020 | Liu et al. |
| 2020/0125162 A1 | 4/2020 | D'Amato et al. |
| 2020/0135194 A1 | 4/2020 | Jeong |
| 2020/0135224 A1 | 4/2020 | Bromand et al. |
| 2020/0184980 A1 | 6/2020 | Wilberding |
| 2020/0244650 A1 | 7/2020 | Burris et al. |
| 2020/0342869 A1 | 10/2020 | Lee et al. |
| 2020/0409926 A1 | 12/2020 | Srinivasan et al. |
| 2021/0118439 A1 | 4/2021 | Schillmoeller et al. |
| 2021/0295849 A1 | 9/2021 | Van Der Ven et al. |
| 2021/0358481 A1 | 11/2021 | D'Amato et al. |
| 2022/0036882 A1 | 2/2022 | Ahn et al. |
| 2022/0050585 A1 | 2/2022 | Fettes et al. |
| 2022/0083136 A1 | 3/2022 | DeLeeuw |
| 2022/0301561 A1 | 9/2022 | Robert Jose et al. |

FOREIGN PATENT DOCUMENTS

| | | |
|---|---|---|
| CN | 101427154 A | 5/2009 |
| CN | 102999161 A | 3/2013 |
| CN | 104572009 A | 4/2015 |
| CN | 104885406 A | 9/2015 |
| CN | 104885438 A | 9/2015 |
| CN | 105162886 A | 12/2015 |
| CN | 105284168 A | 1/2016 |
| CN | 105389099 A | 3/2016 |
| CN | 105427861 A | 3/2016 |
| CN | 105453179 A | 3/2016 |
| CN | 105472191 A | 4/2016 |
| CN | 105493179 A | 4/2016 |
| CN | 105632486 A | 6/2016 |
| CN | 106030699 A | 10/2016 |
| CN | 106796784 A | 5/2017 |
| CN | 106910500 A | 6/2017 |
| CN | 107122158 A | 9/2017 |
| CN | 107465974 A | 12/2017 |
| CN | 107644313 A | 1/2018 |
| CN | 107767863 A | 3/2018 |
| CN | 107832837 A | 3/2018 |
| CN | 107919116 A | 4/2018 |
| CN | 108028047 A | 5/2018 |
| CN | 108028048 A | 5/2018 |
| CN | 108198548 A | 6/2018 |
| GB | 2501367 A | 10/2013 |
| JP | 2004109361 A | 4/2004 |
| JP | 2004163590 A | 6/2004 |
| JP | 2007235875 A | 9/2007 |
| JP | 2008217444 A | 9/2008 |
| JP | 2014510481 A | 4/2014 |
| JP | 2016009193 A | 1/2016 |
| JP | 2019109510 A | 7/2019 |
| TW | 201629950 A | 8/2016 |
| WO | 2008096414 A1 | 8/2008 |
| WO | 2015133022 A1 | 9/2015 |
| WO | 2015195216 A1 | 12/2015 |
| WO | 2016003509 A1 | 1/2016 |
| WO | 2016014686 A1 | 1/2016 |
| WO | 2016136062 A1 | 9/2016 |
| WO | 2018140777 A1 | 8/2018 |
| WO | 2019005772 A1 | 1/2019 |

OTHER PUBLICATIONS

Non-Final Office Action dated Oct. 25, 2022, issued in connection with U.S. Appl. No. 17/549,034, filed Dec. 13, 2021, 20 pages.
Non-Final Office Action dated May 26, 2022, issued in connection with U.S. Appl. No. 16/989,805, filed Aug. 10, 2020, 14 pages.
Non-Final Office Action dated Feb. 27, 2023, issued in connection with U.S. Appl. No. 17/493,430, filed Oct. 4, 2021, 17 pages.
Non-Final Office Action dated Feb. 28, 2023, issued in connection with U.S. Appl. No. 17/548,921, filed Dec. 13, 2021, 12 pages.
Non-Final Office Action dated Mar. 28, 2022, issued in connection with U.S. Appl. No. 17/222,151, filed Apr. 5, 2021, 5 pages.
Non-Final Office Action dated Jul. 3, 2023, issued in connection with U.S. Appl. No. 17/135,173, filed Dec. 28, 2020, 22 pages.
Non-Final Office Action dated Sep. 30, 2022, issued in connection with U.S. Appl. No. 17/353,254, filed Jun. 21, 2021, 22 pages.
Non-Final Office Action dated Nov. 4, 2022, issued in connection with U.S. Appl. No. 17/445,272, filed Aug. 17, 2021, 22 pages.
Non-Final Office Action dated Oct. 4, 2022, issued in connection with U.S. Appl. No. 16/915,234, filed on Jun. 29, 2020, 16 pages.
Non-Final Office Action dated Apr. 5, 2023, issued in connection with U.S. Appl. No. 18/145,501, filed Dec. 22, 2022, 6 pages.
Non-Final Office Action dated Jul. 5, 2023, issued in connection with U.S. Appl. No. 18/061,579, filed Dec. 5, 2022, 11 pages.
Non-Final Office Action dated Feb. 7, 2023, issued in connection with U.S. Appl. No. 17/303,001, filed May 18, 2021, 8 pages.
Non-Final Office Action dated Jun. 7, 2023, issued in connection with U.S. Appl. No. 16/179,779, filed Nov. 2, 2018, 29 pages.
Non-Final Office Action dated Mar. 7, 2022, issued in connection with U.S. Appl. No. 16/812,758, filed Mar. 9, 2020, 18 pages.
Non-Final Office Action dated Feb. 8, 2022, issued in connection with U.S. Appl. No. 16/806,747, filed Mar. 2, 2020, 17 pages.
Non-Final Office Action dated Jun. 8, 2023, issued in connection with U.S. Appl. No. 18/048,034, filed Oct. 20, 2022, 8 pages.
Non-Final Office Action dated Jun. 8, 2023, issued in connection with U.S. Appl. No. 18/061,243, filed Dec. 2, 2022, 10 pages.
Notice of Allowance dated Nov. 2, 2022, issued in connection with U.S. Appl. No. 16/989,805, filed Aug. 10, 2020, 5 pages.
Notice of Allowance dated Nov. 3, 2022, issued in connection with U.S. Appl. No. 17/448,015, filed Sep. 17, 2021, 7 pages.
Notice of Allowance dated Feb. 6, 2023, issued in connection with U.S. Appl. No. 17/077,974, filed Oct. 22, 2020, 7 pages.
Notice of Allowance dated Jan. 6, 2023, issued in connection with U.S. Appl. No. 17/896,129, filed Aug. 26, 2022, 13 pages.
Notice of Allowance dated Dec. 7, 2022, issued in connection with U.S. Appl. No. 17/315,599, filed May 10, 2021, 11 pages.
Notice of Allowance dated Feb. 8, 2023, issued in connection with U.S. Appl. No. 17/446,690, filed Sep. 1, 2021, 8 pages.
Notice of Allowance dated Jan. 9, 2023, issued in connection with U.S. Appl. No. 17/247,507, filed Dec. 14, 2020, 8 pages.
Notice of Allowance dated Jun. 9, 2023, issued in connection with U.S. Appl. No. 17/532,674, filed Nov. 22, 2021, 13 pages.
Notice of Allowance dated Mar. 9, 2023, issued in connection with U.S. Appl. No. 17/662,302, filed May 6, 2022, 7 pages.
Notice of Allowance dated Nov. 9, 2022, issued in connection with U.S. Appl. No. 17/385,542, filed Jul. 26, 2021, 8 pages.
Notice of Allowance dated Mar. 1, 2022, issued in connection with U.S. Appl. No. 16/879,549, filed May 20, 2020, 9 pages.
Notice of Allowance dated Jul. 10, 2023, issued in connection with U.S. Appl. No. 17/315,599, filed May 10, 2021, 2 pages.
Notice of Allowance dated Jun. 10, 2022, issued in connection with U.S. Appl. No. 16/879,549, filed May 20, 2020, 8 pages.
Notice of Allowance dated May 11, 2022, issued in connection with U.S. Appl. No. 17/135,123, filed Dec. 28, 2020, 8 pages.

(56) References Cited

OTHER PUBLICATIONS

Notice of Allowance dated May 11, 2022, issued in connection with U.S. Appl. No. 17/145,667, filed Jan. 11, 2021, 7 pages.
Notice of Allowance dated May 11, 2023, issued in connection with U.S. Appl. No. 18/061,638, filed Dec. 5, 2022, 15 pages.
Notice of Allowance dated May 11, 2023, issued in connection with U.S. Appl. No. 18/061,638, filed Dec. 6, 2022, 15 pages.
Notice of Allowance dated Jul. 12, 2022, issued in connection with U.S. Appl. No. 16/907,953, filed Jun. 22, 2020, 8 pages.
Notice of Allowance dated Jul. 12, 2022, issued in connection with U.S. Appl. No. 17/391,404, filed Aug. 2, 2021, 13 pages.
Notice of Allowance dated Jul. 12, 2023, issued in connection with U.S. Appl. No. 18/151,619, filed Jan. 9, 2023, 13 pages.
Notice of Allowance dated Jun. 12, 2023, issued in connection with U.S. Appl. No. 17/453,632, filed Nov. 4, 2021, 9 pages.
Notice of Allowance dated Apr. 13, 2022, issued in connection with U.S. Appl. No. 17/236,559, filed Apr. 21, 2021, 7 pages.
Notice of Allowance dated Feb. 13, 2023, issued in connection with U.S. Appl. No. 18/045,360, filed Oct. 10, 2022, 9 pages.
Notice of Allowance dated Jul. 13, 2023, issued in connection with U.S. Appl. No. 18/145,501, filed Dec. 22, 2022, 9 pages.
Notice of Allowance dated Jun. 13, 2023, issued in connection with U.S. Appl. No. 17/249,776, filed Mar. 12, 2021, 10 pages.
Notice of Allowance dated Aug. 15, 2022, issued in connection with U.S. Appl. No. 17/101,949, filed Nov. 23, 2020, 11 pages.
Notice of Allowance dated Feb. 15, 2023, issued in connection with U.S. Appl. No. 17/659,613, filed Apr. 18, 2022, 21 pages.
Notice of Allowance dated Jun. 15, 2023, issued in connection with U.S. Appl. No. 17/305,698, filed Jul. 13, 2021, 8 pages.
Notice of Allowance dated Jun. 15, 2023, issued in connection with U.S. Appl. No. 17/305,920, filed Jul. 16, 2021, 8 pages.
Notice of Allowance dated Sep. 15, 2022, issued in connection with U.S. Appl. No. 16/736,725, filed Jan. 1, 2020, 11 pages.
Notice of Allowance dated Aug. 17, 2022, issued in connection with U.S. Appl. No. 17/135,347, filed Dec. 28, 2020, 14 pages.
Notice of Allowance dated Nov. 17, 2022, issued in connection with U.S. Appl. No. 17/486,222, filed Sep. 27, 2021, 10 pages.
Notice of Allowance dated Jul. 18, 2022, issued in connection with U.S. Appl. No. 17/222,151, filed Apr. 5, 2021, 5 pages.
Notice of Allowance dated Dec. 20, 2022, issued in connection with U.S. Appl. No. 16/806,747, filed Mar. 2, 2020, 5 pages.
Notice of Allowance dated Jan. 20, 2023, issued in connection with U.S. Appl. No. 16/915,234, filed Jun. 29, 2020, 6 pages.
Notice of Allowance dated Jun. 20, 2022, issued in connection with U.S. Appl. No. 16/947,895, filed Aug. 24, 2020, 7 pages.
Notice of Allowance dated Mar. 20, 2023, issued in connection with U.S. Appl. No. 17/562,412, filed Dec. 27, 2021, 9 pages.
Notice of Allowance dated Mar. 21, 2023, issued in connection with U.S. Appl. No. 17/353,254, filed Jun. 21, 2021, 8 pages.
Notice of Allowance dated Nov. 21, 2022, issued in connection with U.S. Appl. No. 17/454,676, filed Nov. 12, 2021, 8 pages.
Notice of Allowance dated Sep. 21, 2022, issued in connection with U.S. Appl. No. 17/128,949, filed Dec. 21, 2020, 8 pages.
Notice of Allowance dated Sep. 22, 2022, issued in connection with U.S. Appl. No. 17/163,506, filed Jan. 31, 2021, 13 pages.
Notice of Allowance dated Sep. 22, 2022, issued in connection with U.S. Appl. No. 17/248,427, filed Jan. 25, 2021, 9 pages.
Notice of Allowance dated Feb. 23, 2023, issued in connection with U.S. Appl. No. 17/532,674, filed Nov. 22, 2021, 10 pages.
Notice of Allowance dated Mar. 24, 2022, issued in connection with U.S. Appl. No. 16/378,516, filed Apr. 8, 2019, 7 pages.
Notice of Allowance dated Apr. 26, 2022, issued in connection with U.S. Appl. No. 17/896,129, filed Aug. 26, 2022, 8 pages.
Notice of Allowance dated Apr. 26, 2023, issued in connection with U.S. Appl. No. 17/658,717, filed Apr. 11, 2022, 11 pages.
Notice of Allowance dated Aug. 26, 2022, issued in connection with U.S. Appl. No. 17/145,667, filed Jan. 11, 2021, 8 pages.
Notice of Allowance dated Oct. 26, 2022, issued in connection with U.S. Appl. No. 17/486,574, filed Sep. 27, 2021, 11 pages.
Notice of Allowance dated Jun. 27, 2022, issued in connection with U.S. Appl. No. 16/812,758, filed Mar. 9, 2020, 16 pages.
Notice of Allowance dated Sep. 28, 2022, issued in connection with U.S. Appl. No. 17/444,043, filed Jul. 29, 2021, 17 pages.
Notice of Allowance dated Dec. 29, 2022, issued in connection with U.S. Appl. No. 17/327,911, filed May 24, 2021, 14 pages.
Notice of Allowance dated Jul. 29, 2022, issued in connection with U.S. Appl. No. 17/236,559, filed Apr. 21, 2021, 6 pages.
Notice of Allowance dated Mar. 29, 2023, issued in connection with U.S. Appl. No. 17/722,438, filed Apr. 18, 2022, 7 pages.
Notice of Allowance dated Mar. 3, 2022, issued in connection with U.S. Appl. No. 16/679,538, filed Nov. 11, 2019, 7 pages.
Notice of Allowance dated Jun. 30, 2023, issued in connection with U.S. Appl. No. 17/303,001, filed May 18, 2021, 8 pages.
Notice of Allowance dated Mar. 30, 2023, issued in connection with U.S. Appl. No. 17/303,066, filed May 19, 2021, 7 pages.
Notice of Allowance dated Mar. 31, 2023, issued in connection with U.S. Appl. No. 17/303,735, filed Jun. 7, 2021, 19 pages.
Notice of Allowance dated Apr. 5, 2023, issued in connection with U.S. Appl. No. 17/549,253, filed Dec. 13, 2021, 10 pages.
Notice of Allowance dated Mar. 6, 2023, issued in connection with U.S. Appl. No. 17/449,926, filed Oct. 4, 2021, 8 pages.
Notice of Allowance dated Apr. 8, 2022, issued in connection with U.S. Appl. No. 16/813,643, filed Mar. 9, 2020, 7 pages.
Notice of Allowance dated Feb. 9, 2022, issued in connection with U.S. Appl. No. 17/247,736, filed Dec. 21, 2020, 8 pages.
Simon Doclo et al. Combined Acoustic Echo and Noise Reduction Using GSVD-Based Optimal Filtering. In 2000 IEEE International Conference on Acoustics, Speech, and Signal Processing. Proceedings (Cat. No. 00CH37100), Aug. 6, 2002, 4 pages. [retrieved on Feb. 23, 2023], Retrieved from the Internet: URL: https://scholar.google.com/scholar?hl=en&as_sdt=0%2C14&q=COMBINED+ACOUSTIC+ECHO+AND+NOISE+REDUCTION+USING+GSVD-BASED+OPTIMAL+FILTERING&btnG=.
Wikipedia. "The Wayback Machine", Speech recognition software for Linux, Sep. 22, 2016, 4 pages. [retrieved on Mar. 28, 2022], Retrieved from the Internet: URL: https://web.archive.org/web/20160922151304/https://en.wikipedia.org/wiki/Speech_recognition_software_for_Linux.
Wolf et al. On the potential of channel selection for recognition of reverberated speech with multiple microphones. Interspeech, TALP Research Center, Jan. 2010, 5 pages.
Wölfel et al. Multi-source far-distance microphone selection and combination for automatic transcription of lectures, Interspeech 2006—ICSLP, Jan. 2006, 5 pages.
Zhang et al. Noise Robust Speech Recognition Using Multi-Channel Based Channel Selection and Channel Weighting. The Institute of Electronics, Information and Communication Engineers, arXiv:1604.03276v1 [cs.SD] Jan. 1, 2010, 8 pages.
Final Office Action dated Mar. 29, 2023, issued in connection with U.S. Appl. No. 17/549,034, filed Dec. 13, 2021, 21 pages.
Final Office Action dated Jun. 7, 2022, issued in connection with U.S. Appl. No. 16/736,725, filed Jan. 7, 2020, 14 pages.
Helwani et al. Source-domain adaptive filtering for MIMO systems with application to acoustic echo cancellation. In 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en&as_sdt=0%2C14&q=SOURCE-DOMAIN+ADAPTIVE+FILTERING+FOR+MIMO+SYSTEMS+WITH+APPLICATION+TO+ACOUSTIC+ECHO+CANCELLATION&btnG=.
International Bureau, International Preliminary Report on Patentability, dated Jul. 21, 2022, issued in connection with International Application No. PCT/US2021/070007, filed on Jan. 6, 2021, 8 pages.
International Bureau, International Preliminary Report on Patentability, dated Apr. 26, 2022, issued in connection with International Application No. PCT/US2020/056632, filed on Oct. 21, 2020, 7 pages.
International Bureau, International Search Report and Written Opinion dated Mar. 20, 2023, issued in connection with International Application No. PCT/US2022/045399, filed on Sep. 30, 2022, 25 pages.

(56) References Cited

OTHER PUBLICATIONS

International Searching Authority, Invitation to Pay Additional Fees on Jan. 27, 2023, issued in connection with International Application No. PCT/US2022/045399, filed on Sep. 30, 2022, 19 pages.
Japanese Patent Office, Decision of Refusal and Translation dated Oct. 4, 2022, issued in connection with Japanese Patent Application No. 2021-535871, 6 pages.
Japanese Patent Office, Decision of Refusal and Translation dated May 23, 2023, issued in connection with Japanese Patent Application No. 2021-163622, 13 pages.
Japanese Patent Office, Decision of Refusal and Translation dated Jul. 26, 2022, issued in connection with Japanese Patent Application No. 2020-513852, 10 pages.
Japanese Patent Office, Non-Final Office Action dated Apr. 4, 2023, issued in connection with Japanese Patent Application No. 2021-573944, 5 pages.
Japanese Patent Office, Notice of Reasons for Refusal and Translation dated Sep. 13, 2022, issued in connection with Japanese Patent Application No. 2021-163622, 12 pages.
Japanese Patent Office, Office Action and Translation dated Nov. 15, 2022, issued in connection with Japanese Patent Application No. 2021-146144, 9 pages.
Japanese Patent Office, Office Action dated Nov. 29, 2022, issued in connection with Japanese Patent Application No. 2021-181224, 6 pages.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Korean Patent Office, Korean Examination Report and Translation dated Apr. 10, 2023, issued in connection with Korean Application No. 10-2022-7024007, 8 pages.
Korean Patent Office, Korean Examination Report and Translation dated Oct. 13, 2022, issued in connection with Korean Application No. 10-2021-7030939, 4 pages.
Korean Patent Office, Korean Examination Report and Translation dated Apr. 19, 2022, issued in connection with Korean Application No. 10-2021-7008937, 14 pages.
Korean Patent Office, Korean Examination Report and Translation dated Jul. 26, 2022, issued in connection with Korean Application No. 10-2022-7016656, 17 pages.
Korean Patent Office, Korean Examination Report and Translation dated Mar. 31, 2023, issued in connection with Korean Application No. 10-2022-7016656, 7 pages.
Korean Patent Office, Korean Examination Report and Translation dated Oct. 31, 2021, issued in connection with Korean Application No. 10-2022-7024007, 10 pages.
Korean Patent Office, Office Action and Translation dated Feb. 27, 2023, issued in connection with Korean Application No. 10-2022-7021879, 5 pages.
Mathias Wolfel. Channel Selection by Class Separability Measures for Automatic Transcriptions on Distant Microphones, INTERSPEECH 2007 10.21437/Interspeech.2007-255, 4 pages.
Molina et al., "Maximum Entropy-Based Reinforcement Learning Using a Confidence Measure in Speech Recognition for Telephone Speech," in IEEE Transactions on Audio, Speech, and Language Processing, vol. 18, No. 5, pp. 1041-1052, Jul. 2010, doi: 10.1109/TASL.2009.2032618. [Retrieved online] URLhttps://ieeexplore.ieee.org/document/5247099?partnum=5247099&searchProductType=IEEE%20Journals%20Transactions.
Non-Final Office Action dated Feb. 2, 2023, issued in connection with U.S. Appl. No. 17/305,698, filed Jul. 13, 2021, 16 pages.
Non-Final Office Action dated Dec. 5, 2022, issued in connection with U.S. Appl. No. 17/662,302, filed May 6, 2022, 12 pages.
Non-Final Office Action dated Oct. 5, 2022, issued in connection with U.S. Appl. No. 17/449,926, filed Oct. 4, 2021, 11 pages.
Non-Final Office Action dated Feb. 11, 2022, issued in connection with U.S. Appl. No. 17/145,667, filed Jan. 11, 2021, 9 pages.
Non-Final Office Action dated Apr. 12, 2023, issued in connection with U.S. Appl. No. 17/878,649, filed Aug. 1, 2022, 16 pages.
Non-Final Office Action dated Nov. 14, 2022, issued in connection with U.S. Appl. No. 17/077,974, filed Oct. 22, 2020, 6 pages.
Non-Final Office Action dated Sep. 14, 2022, issued in connection with U.S. Appl. No. 17/446,690, filed Sep. 1, 2021, 10 pages.
Non-Final Office Action dated Aug. 15, 2022, issued in connection with U.S. Appl. No. 17/448,015, filed Sep. 17, 2021, 12 pages.
Non-Final Office Action dated Dec. 15, 2022, issued in connection with U.S. Appl. No. 17/549,253, filed Dec. 13, 2021, 10 pages.
Non-Final Office Action dated Feb. 15, 2023, issued in connection with U.S. Appl. No. 17/453,632, filed Nov. 4, 2021, 12 pages.
Non-Final Office Action dated Sep. 15, 2022, issued in connection with U.S. Appl. No. 17/247,507, filed Dec. 14, 2020, 9 pages.
Non-Final Office Action dated Sep. 15, 2022, issued in connection with U.S. Appl. No. 17/327,911, filed May 24, 2021, 44 pages.
Non-Final Office Action dated Feb. 16, 2023, issued in connection with U.S. Appl. No. 17/305,920, filed Jul. 16, 2021, 12 pages.
Non-Final Office Action dated Jul. 18, 2023, issued in connection with U.S. Appl. No. 18/066,093, filed Dec. 14, 2022, 12 pages.
Non-Final Office Action dated Oct. 18, 2022, issued in connection with U.S. Appl. No. 16/949,973, filed Nov. 23, 2020, 31 pages.
Non-Final Office Action dated Sep. 19, 2022, issued in connection with U.S. Appl. No. 17/385,542, filed Jul. 26, 2021, 9 pages.
Non-Final Office Action dated Apr. 20, 2023, issued in connection with U.S. Appl. No. 18/061,570, filed Dec. 5, 2022, 12 pages.
Non-Final Office Action dated Oct. 20, 2022, issued in connection with U.S. Appl. No. 17/532,674, filed Nov. 22, 2021, 52 pages.
Non-Final Office Action dated Dec. 22, 2022, issued in connection with U.S. Appl. No. 16/168,389, filed Oct. 23, 2018, 39 pages.
Non-Final Office Action dated Jun. 23, 2023, issued in connection with U.S. Appl. No. 18/048,945, filed Oct. 24, 2022, 10 pages.
Non-Final Office Action dated Mar. 23, 2022, issued in connection with U.S. Appl. No. 16/907,953, filed Jun. 22, 2020, 7 pages.
Non-Final Office Action dated Sep. 23, 2022, issued in connection with U.S. Appl. No. 16/153,530, filed Oct. 5, 2018, 25 pages.
Non-Final Office Action dated Apr. 24, 2023, issued in connection with U.S. Appl. No. 17/532,744, filed Nov. 22, 2021, 18 pages.
Non-Final Office Action dated May 24, 2022, issued in connection with U.S. Appl. No. 17/101,949, filed Nov. 23, 2020, 10 pages.
Non-Final Office Action dated Apr. 25, 2023, issued in connection with U.S. Appl. No. 17/536,572, filed Nov. 29, 2021, 8 pages.
Non-Final Office Action dated Apr. 25, 2023, issued in connection with U.S. Appl. No. 17/656,794, filed Mar. 28, 2022, 22 pages.
Advisory Action dated Nov. 7, 2022, issued in connection with U.S. Appl. No. 16/168,389, filed Oct. 23, 2018, 4 pages.
Advisory Action dated Feb. 28, 2022, issued in connection with U.S. Appl. No. 16/813,643, filed Mar. 9, 2020, 3 pages.
Australian Patent Office, Australian Examination Report Action dated Nov. 10, 2022, issued in connection with Australian Application No. 2018312989, 2 pages.
Australian Patent Office, Australian Examination Report Action dated Jul. 11, 2023, issued in connection with Australian Application No. 2022246446, 2 pages.
Australian Patent Office, Australian Examination Report Action dated Jun. 14, 2023, issued in connection with Australian Application No. 2019299865, 2 pages.
Australian Patent Office, Australian Examination Report Action dated May 19, 2022, issued in connection with Australian Application No. 2021212112, 2 pages.
Australian Patent Office, Australian Examination Report Action dated Sep. 28, 2022, issued in connection with Australian Application No. 2018338812, 3 pages.
Australian Patent Office, Australian Examination Report Action dated Mar. 4, 2022, issued in connection with Australian Application No. 2021202786, 2 pages.
Canadian Patent Office, Canadian Examination Report dated Sep. 14, 2022, issued in connection with Canadian Application No. 3067776, 4 pages.
Canadian Patent Office, Canadian Examination Report dated Oct. 19, 2022, issued in connection with Canadian Application No. 3123601, 5 pages.
Canadian Patent Office, Canadian Examination Report dated Mar. 29, 2022, issued in connection with Canadian Application No. 3111322, 3 pages.

(56) References Cited

OTHER PUBLICATIONS

Canadian Patent Office, Canadian Examination Report dated Jun. 7, 2022, issued in connection with Canadian Application No. 3105494, 5 pages.
Chinese Patent Office, First Office Action and Translation dated Jun. 1, 2021, issued in connection with Chinese Application No. 201980089721.5, 21 pages.
Chinese Patent Office, First Office Action and Translation dated Feb. 9, 2023, issued in connection with Chinese Application No. 201880076788.0, 13 pages.
Chinese Patent Office, First Office Action and Translation dated Oct. 9, 2022, issued in connection with Chinese Application No. 201780056695.7, 10 pages.
Chinese Patent Office, First Office Action and Translation dated Nov. 10, 2022, issued in connection with Chinese Application No. 201980070006.7, 15 pages.
Chinese Patent Office, First Office Action and Translation dated Jan. 19, 2023, issued in connection with Chinese Application No. 201880064916.X, 10 pages.
Chinese Patent Office, First Office Action and Translation dated Sep. 19, 2022, issued in connection with Chinese Application No. 201980056604.9, 13 pages.
Chinese Patent Office, First Office Action and Translation dated Nov. 25, 2022, issued in connection with Chinese Application No. 201780056321.5, 8 pages.
Chinese Patent Office, First Office Action and Translation dated Feb. 27, 2023, issued in connection with Chinese Application No. 201980003798.6, 12 pages.
Chinese Patent Office, First Office Action and Translation dated Dec. 30, 2022, issued in connection with Chinese Application No. 201880076775.3, 10 pages.
Chinese Patent Office, Second Office Action and Translation dated Mar. 3, 2022, issued in connection with Chinese Application No. 201880077216.4, 11 pages.
Chinese Patent Office, Second Office Action and Translation dated Apr. 1, 2023, issued in connection with Chinese Application No. 201980056604.9, 11 pages.
Chinese Patent Office, Second Office Action dated Dec. 21, 2022, issued in connection with Chinese Application No. 201980089721.5, 12 pages.
Chinese Patent Office, Second Office Action dated May 30, 2023, issued in connection with Chinese Application No. 201980070006.7, 9 pages.
European Patent Office, Decision to Refuse European Patent Application dated May 30, 2022, issued in connection with European Application No. 17200837.7, 4 pages.
European Patent Office, European EPC Article 94.3 mailed on Jun. 5, 2023, issued in connection with European Application No. 20710649.3, 8 pages.
European Patent Office, European EPC Article 94.3 mailed on Feb. 10, 2023, issued in connection with European Application No. 19729968.8, 7 pages.
European Patent Office, European EPC Article 94.3 mailed on Mar. 11, 2022, issued in connection with European Application No. 19731415.6, 7 pages.
European Patent Office, European EPC Article 94.3 mailed on May 2, 2022, issued in connection with European Application No. 20185599.6, 7 pages.
European Patent Office, European EPC Article 94.3 mailed on Jun. 21, 2022, issued in connection with European Application No. 19780508.8, 5 pages.
European Patent Office, European EPC Article 94.3 mailed on Feb. 23, 2023, issued in connection with European Application No. 19839734.1, 8 pages.
European Patent Office, European EPC Article 94.3 mailed on Nov. 28, 2022, issued in connection with European Application No. 18789515.6, 7 pages.
European Patent Office, European EPC Article 94.3 mailed on Mar. 3, 2022, issued in connection with European Application No. 19740292.8, 10 pages.
European Patent Office, European EPC Article 94.3 mailed on Jun. 30, 2022, issued in connection with European Application No. 19765953.5, 4 pages.
European Patent Office, European Extended Search Report dated Oct. 7, 2022, issued in connection with European Application No. 22182193.7, 8 pages.
European Patent Office, European Extended Search Report dated Apr. 22, 2022, issued in connection with European Application No. 21195031.6, 14 pages.
European Patent Office, European Extended Search Report dated Jun. 23, 2022, issued in connection with European Application No. 22153180.9, 6 pages.
European Patent Office, European Extended Search Report dated Jun. 30, 2022, issued in connection with European Application No. 21212763.3, 9 pages.
European Patent Office, European Extended Search Report dated Jul. 8, 2022, issued in connection with European Application No. 22153523.0, 9 pages.
European Patent Office, European Search Report dated Mar. 1, 2022, issued in connection with European Application No. 21180778.9, 9 pages.
European Patent Office, European Search Report dated Oct. 4, 2022, issued in connection with European Application No. 22180226.7, 6 pages.
European Patent Office, Summons to Attend Oral Proceedings mailed on Jul. 15, 2022, issued in connection with European Application No. 17792272.1, 11 pages.
European Patent Office, Summons to Attend Oral Proceedings mailed on Feb. 4, 2022, issued in connection with European Application No. 17757075.1, 10 pages.
Final Office Action dated Jun. 1, 2022, issued in connection with U.S. Appl. No. 16/806,747, filed Mar. 2, 2020, 20 pages.
Final Office Action dated Aug. 17, 2022, issued in connection with U.S. Appl. No. 16/179,779, filed Nov. 2, 2018, 26 pages.
Final Office Action dated May 17, 2023, issued in connection with U.S. Appl. No. 16/168,389, filed Oct. 23, 2018, 44 pages.
Final Office Action dated Mar. 21, 2022, issued in connection with U.S. Appl. No. 16/153,530, filed Oct. 5, 2018, 23 pages.
Final Office Action dated Aug. 22, 2022, issued in connection with U.S. Appl. No. 16/168,389, filed Oct. 23, 2018, 37 pages.
Final Office Action dated Jul. 27, 2022, issued in connection with U.S. Appl. No. 16/989,350, filed Aug. 10, 2020, 15 pages.

* cited by examiner

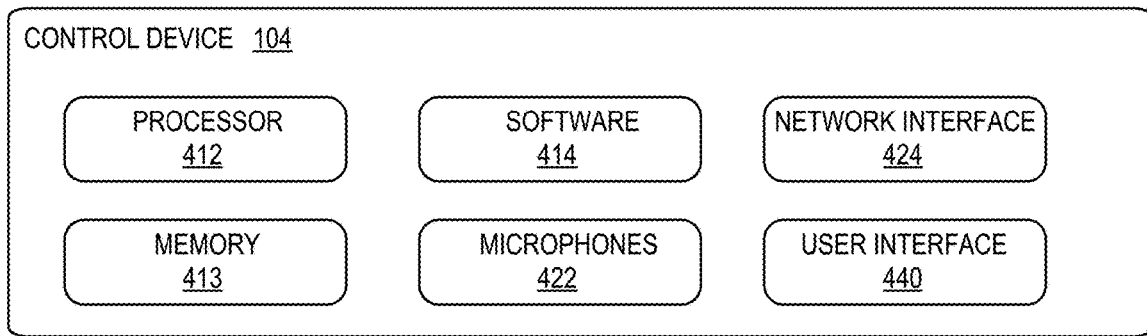
*Figure 4A*
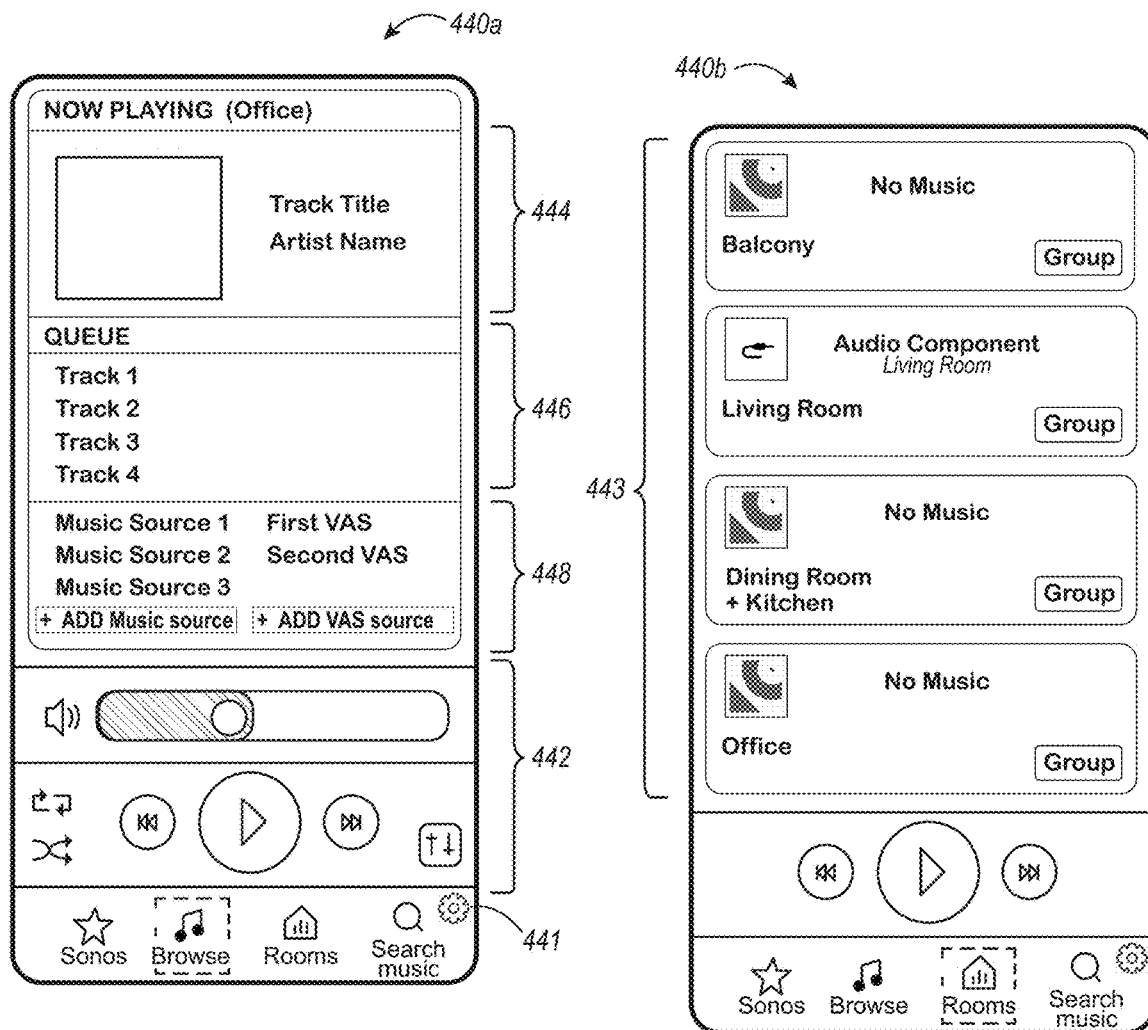
*Figure 4B*
*Figure 4C*

NETWORKED MICROPHONE DEVICES, SYSTEMS, AND METHODS OF LOCALIZED ARBITRATION

CROSS-REFERENCE TO RELATED APPLICATIONS

This application claims the benefit of priority under 35 U.S.C. § 120 as a continuation of U.S. application Ser. No. 17/486,574 filed on Sep. 27, 2021, and titled "NETWORKED MICROPHONE DEVICES, SYSTEMS, & METHODS OF LOCALIZED ARBITRATION," which is a continuation of U.S. application Ser. No. 16/219,702 filed on Dec. 13, 2018, and titled "NETWORKED MICROPHONE DEVICES, SYSTEMS, & METHODS OF LOCALIZED ARBITRATION," the contents of each of which are incorporated herein by reference in their entirety.

TECHNICAL FIELD

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 4A is a functional block diagram of an example controller device in accordance with aspects of the disclosure;

FIGS. 4B and 4C are controller interfaces in accordance with aspects of the disclosure;

Figure 1A:
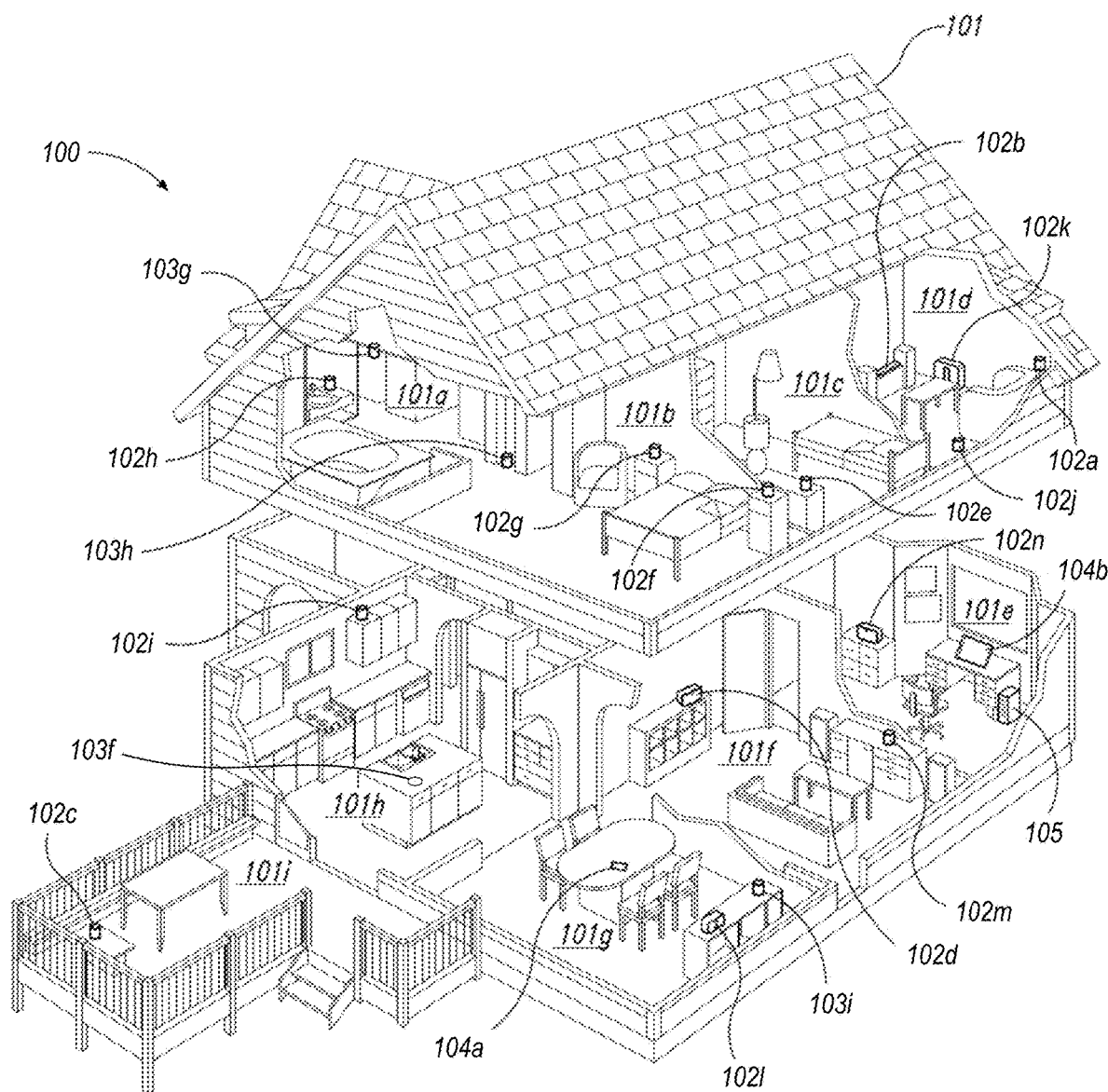
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103*a* is first introduced and discussed with reference to FIG. 1A.

DETAILED DESCRIPTION

I. Overview

Voice control can be beneficial in a "smart" home that includes smart appliances and devices that are connected to a communication network, such as wireless audio playback devices, illumination devices, and home-automation devices (e.g., thermostats, door locks, etc.). A network microphone device (NMD) may be used to control smart home devices. In various implementations described in greater detail below, an NMD may be implemented to control a playback device (which may include an NMD-equipped playback device), such as to adjust volume, change playback state (e.g., pause/play), select a song, and/or perform myriad other operations.

An NMD is a networked computing device that typically includes an arrangement of microphones, such as a microphone array, that is configured to detect sounds present in the NMD's environment. The detected sound may include a person's speech mixed with background noise (e.g., music being output by a playback device or other ambient noise). In practice, an NMD typically filters detected sound to remove the background noise from the person's speech to facilitate identifying whether the speech contains a voice input indicative of voice control. If so, the NMD may take action based on such a voice input.

A voice input will typically include a wake word followed by an utterance comprising a user request. A wake word is typically a predetermined word or phrase used to "wake up" an NMD and cause it to invoke a particular voice assistant service ("VAS") to interpret the intent of the voice input. In practice, an NMD will typically transmit the voice input, or at least a portion thereof (e.g., the utterance portion), to the VAS corresponding to the particular wake word contained in the voice input. For example, a user might speak the wake word "Alexa" to invoke the AMAZON VAS, "Ok, Google" to invoke the GOOGLE VAS, "Hey, Siri" to invoke the APPLE VAS, or "Hey, Sonos" to invoke a VAS offered by SONOS, among other examples. In practice, a wake word may also be referred to as, for example, an activation-, trigger-, wakeup-word or -phrase, and may take the form of any suitable word, combination of words (e.g., a particular phrase), and/or some other audio cue.

An NMD often employs a wake-word engine, which is typically onboard the NMD, to identify whether sound detected by the NMD contains a voice input that includes a particular wake word. The wake-word engine may be configured to identify (i.e., "spot") a particular wake word using one or more identification algorithms. This wake-word identification process is commonly referred to as "keyword spotting." In practice, to help facilitate keyword spotting, the NMD may buffer sound detected by a microphone of the NMD and then use the wake-word engine to process that buffered sound to determine whether a wake word is present.

When a wake-word engine spots a wake word in detected sound, the NMD may determine that a wake-word event (i.e., a "wake-word trigger") has occurred, which indicates that the NMD has detected sound that includes a potential voice input. The occurrence of the wake-word event typically causes the NMD to perform additional processes involving the detected sound. In some implementations, these additional processes may include outputting an alert (e.g., an audible chime and/or a light indicator) indicating that a wake word has been identified and extracting detected-sound data from a buffer, among other possible additional processes. Extracting the detected sound may include reading out and packaging a stream of the detected-sound data according to a particular format and transmitting the packaged detected-sound data to an appropriate VAS for interpretation.

In turn, the VAS corresponding to the wake word that was identified by the wake-word engine receives the transmitted sound data from the NMD over a communication network. A VAS traditionally takes the form of a remote service implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and remote devices. Additionally, or alternatively, a VAS may take the form of a local service implemented at an NMD or a media playback system comprising the NMD such that a voice input or certain types of voice input (e.g., rudimentary commands) are processed locally without intervention from a remote VAS.

In any case, when a VAS receives detected-sound data, the VAS will typically process this data, which involves identifying the voice input and determining an intent of words captured in the voice input. The VAS may then provide a response back to the NMD with some instruction according to the determined intent. Based on that instruction, the NMD may cause one or more smart devices to perform an action.

In operation, the action that the VAS instructs the NMD to take based on identifying a voice input can take a variety of forms. For example, the instruction may take the form of VAS response data that is indicative of a given VAS response corresponding to the voice input for the NMD to play back. The VAS response may generally involve the NMD outputting various types of audio and/or visual indications. For instance, a VAS response may comprise playing back chimes, spoken words, audible tones, and/or various other forms of audio played back in response to a voice input. Some of these VAS responses may indicate whether the VAS and/or the NMD will perform a given action (e.g., begin music playback, output requested information, etc.) specified by the voice utterance of the voice input. VAS responses may take various other forms as well.

In some implementations, an NMD may form part of a system comprising multiple NMDs. Indeed, a growing number of environments today have multiple NMDs. For instance, a household may include multiple NMD-equipped playback devices to fill more areas and/or rooms of a home with music and/or to provide more areas with voice-enabled services.

In environments having multiple NMDs, some or all of the NMDs may identify a same wake word. For example, when multiple NMDs in a given environment are configured to identify the same ALEXA wake word, and more than one of the NMDs identify the same wake word, each identifying NMD may trigger its respective internal voice capture components to extract detected-sound data for evaluation by a VAS. When more than one NMD identifies a common wake word, a VAS, which may be located in the cloud, may typically determine which of the NMDs identified the wake word with a highest confidence level. The VAS will then select a given NMD that identified the wake word with the highest confidence level, and after selecting the given NMD that identified the wake word with the highest measure of confidence, may cause the selected NMD to take one or more actions, which may take the form of one or more outputs, as some examples.

The non-selected NMDs may enter an idle state after determining that they have not been selected to perform extraction of detected-sound data. The selected NMD will also return to an idle state after extracting detected-sound data and/or generating any outputs. Once an NMD enters and idle state, an NMD may remain in the idle state until the NMD identifies another wake word.

When a user speaks the same wake word a subsequent time, and more than one NMD again identifies the same wake word, the VAS repeats the process of selecting a given one of the NMDs that identified the wake word with the highest confidence level. The NMD selected for the next interaction may be the previously-selected NMD if the previously-selected NMD identified the wake word with the highest confidence level or may be another NMD if an NMD other than the previously-selected NMD identified the wake word with the highest confidence level. The process of selecting a given NMD to extract sound-data that may contain a voice input from multiple NMDs that have identified a particular wake word may be referred to herein as "arbitration."

Typically, the NMD that the VAS designates to perform extraction as part of performing the arbitration process is also designated to output the VAS response and to take one or more actions instructed by the VAS, for example to control audio playback, etc. However, there may be issues that arise from designating the same NMD that is selected to perform extraction to also output the VAS response and/or to take one or more instructed actions. Namely, the NMD that the VAS ultimately designates to perform extraction may not be the NMD that the user expected to output the VAS response or to take the one or more actions instructed by the VAS.

For instance, an NMD located in a different room than the user may identify a wake word with a greater confidence level than an NMD located in the same room as the user. As an example, the NMD in the different room may identify the wake word with a greater confidence level than the NMD in the same room as the user due to the way sound is reflected and absorbed by objects and surfaces in the two rooms. In any case, the selected NMD located in the different room may then output a VAS response. However, the user may have expected the NMD located in the same room to output the VAS response rather than the NMD located in the different room.

When an NMD other than the one a user expects outputs a VAS response in response to an identified wake word, this unexpected VAS response may cause user frustration. For example, a user located in a living room of a home may have wanted an NMD to take an action instructed by the VAS in the form of playing back audio in the living room. However, due to the acoustics in the user's home, the NMD in the bedroom may identify a spoken wake word with a higher confidence level than the NMD in the living room. As a result, the NMD in the bedroom may output a VAS response and may begin playing back audio in the bedroom. As a result of the NMD located in the bedroom playing back audio, the user may have user may have walk to the bedroom to stop the audio playback by speaking or otherwise issuing a command to stop the bedroom NMD's playback.

In some cases, the particular NMD that generates an output in response to identifying a wake word at a given time may appear to be arbitrarily chosen and may change seemingly without explanation, a phenomenon referred to herein as "ping-ponging." Indeed, the NMDs that output VAS responses and/or take one or more actions instructed by the VAS in response to voice multiple inputs may appear to ping pong from one NMD to another NMD, which is seemingly arbitrary and also disorientating to a user. As an example, a user may speak a first wake word followed by a first voice input. In response to identifying the first wake word with a highest confidence level and being selected by a VAS, a first NMD of two or more NMDs may generate an output. Thereafter, the user who may be located in the same location as when speaking the first wake word and voice input, may speak a second wake word followed by a second voice input. In response to identifying the second wake word, a second NMD of the two or more NMDs may generate an output. Thus, the output generated by the first and second NMDs ping-pong's due to the outputting NMD changing between the first and second NMDs in response to successively identified wake words.

In addition to occurring between NMDs located in different rooms, ping-ponging can also occur between NMDs situated in the same room. For example, in response to a user speaking a first wake word followed by a voice utterance, a first NMD located near the user on one side of a room may identify the first wake word with a higher confidence level than a second NMD located on another side of a room. In response to the first NMD identifying the first wake word with the higher confidence level, the first NMD may output a VAS response. After the speaking the first wake word, the user may then turn to face the second NMD across the room and may speak a second wake word followed by a second voice utterance expecting the second NMD to identify the wake word with a higher confidence level, only to have the first NMD again identify the first wake word with a higher confidence level and respond to the user by outputting a VAS response.

Additionally, in the implementations described above, each NMD that identifies a given wake word followed by a voice utterance may transmit data associated with the voice utterance and/or wake word to the VAS, which is typically located in the cloud. The overall amount of bandwidth utilized by a media playback system having multiple NMDs that each send data for arbitration do a cloud-based VAS may be relatively high given that each NMD sends data associated with a wake word and/or a voice utterance to the VAS.

Example devices, systems, and methods disclosed herein address these and other technical problems that arise in the context of multiple NMDs. More specifically, this disclosure describes in various embodiments NMDs are configured to locally arbitrate between one another (i.e., rather than using remote cloud servers to perform arbitration). In one aspect of this disclosure, a single NMD within a set of NMDs is selected as the local arbitrator, or "arbitrator NMD." Further, performing local arbitration as described herein may be advantageous over remote arbitration because of the bandwidth savings achieved by avoiding sending the data of multiple redundant wake words and/or voice inputs from each NMD to the VAS for remote arbitration. Local arbitration may be advantageous for a variety of other reasons as well.

In a related aspect, the arbitrator NMD may also be designated for outputting VAS responses, which may provide a behavior that more closely aligns with a user's expectations and reduces or eliminates the aforementioned unexpected behaviors, such as ping-ponging. While the arbitrator NMD is described as being the same NMD that is designated for outputting VAS responses, it should be understood that an NMD other than the arbitrator may be designated for outputting a VAS response as well.

In example embodiments, a network media playback system includes two or more NMDs, each of which is configured to detect sound that may comprise a voice input. At least one of these NMDs may be designated as the arbitrator NMD, which may be responsible for selecting which NMD is to be the default NMD for outputting a VAS response among a set of NMDs that have identified a same wake word. In various embodiments, the local arbitrator may also determine the NMD among the set of NMDs that is to extract detected-sound data for evaluation by a VAS in response to multiple NMDs in the set identifying a same wake word. In some embodiments, an NMD other than the arbitrator may be selected to extract detected-sound data to a remote VAS.

In some implementations, a device that may be designated to output a VAS response, which may comprise the arbitrator NMD, may be assigned during the configuration of the media playback system that includes the two or more NMDs. In some cases, the arbitrator responsibilities may be assigned to a given NMD in the set based on the NMD's role or hardware resources.

In addition, or alternatively, the arbitrator responsibilities may be assigned to a given NMD based on other considerations. For instance, the arbitrator responsibilities may be assigned to an NMD that has already been assigned other responsibilities within the media playback system. As one example, an NMD designated as the "group coordinator" that is responsible for facilitating synchronous playback of audio among the two or more NMDs may be assigned the arbitrator responsibilities as well. As another example, an NMD designated as the "primary" device that is responsible for playing back a given audio channel, such as the center channel of a home theatre setup or either the left channel of a stereo pair setup, may also be assigned the arbitrator responsibilities. However, in other instances, the arbitrator NMD may not be assigned any of the aforementioned other responsibilities.

In any case, in accordance with example embodiments provided herein, local arbitration may generally involve two or more NMDs of the media playback system identifying a particular wake word, the arbitrator NMD selecting one of the NMDs to extract detected-sound data that may include a voice input for evaluation by the VAS, and after evaluation of the voice input by the VAS, the arbitrator NMD playing back a VAS response generated by the VAS.

More specifically, in an example implementation, each non-arbitrator NMD that identifies a particular wake word may transmit to the arbitrator NMD a notification that a wake word was identified. In some examples, a given notification may include a confidence level that the given non-arbitrator NMD identified the particular wake word correctly. In the case that an identifying NMD is the arbitrator NMD, the arbitrator NMD may not transmit a message that includes a confidence level but instead may generate an internal notification, which may include a confidence level that the arbitrator NMD identified the wake word correctly.

In practice, a confidence level may take various forms. For example, the confidence level may be a metric calculated based on audio properties of the received wake word. Examples of some such metrics that may be used to calculate the confidence level may include a signal-to-noise ratio (SnR), a frequency spectrum of the identified wake word, a direction of the identified wake word, an amplitude (e.g., decibel level) of the identified wake word, etc. A confidence level may take various other forms as well.

In turn, the arbitrator NMD receives each of the notifications. Based on these notifications, the arbitrator NMD may determine that more than one of the NMDs has identified the wake word at the same time. In response to this determination, the arbitrator NMD may next select which of the identifying NMDs is to extract the detected-sound data for evaluation by the VAS. The arbitrator NMD may make this selection in various manners.

As one example, if the notifications include respective confidence levels, the arbitrator NMD may select the NMD having the highest confidence level. As another example, if the NMDs have differing roles, the arbitrator NMD may use these roles as a basis for selecting the NMD. Other examples of selecting the extraction NMD are also possible.

After selecting an NMD to extract the voice input, the arbitrator NMD may cause the selected NMD to extract detected-sound data that may include a voice input for evaluation by the VAS. In this respect, it should be understood that the extraction NMD may differ from, or be the same as, the arbitrator NMD that is designated to output a voice output. The process of causing the selected NMD to extract the detected-sound data that may include a voice input may take various forms.

As one example, if the arbitrator NMD selects a non-arbitrator NMD, then the arbitrator NMD may send an instruction to the non-arbitrator NMD to extract the detected-sound data for evaluation by the appropriate VAS. As another example, if the arbitrator NMD selects itself, then the arbitrator NMD may trigger its internal voice capture components to extract the detected-sound data that may include a voice input for evaluation by the VAS.

After extracting the voice input, the selected NMD may format the detected-sound data into a sound-data stream and transmit the sound-data stream containing at least the detected-sound data that may include a voice input (and perhaps also the wake word) to the VAS either directly via a communication network that couples the VAS and the media playback system or indirectly via the arbitrator NMD. In this respect, only one NMD transmits a sound-data stream to the VAS, which consumes significantly less bandwidth than when multiple NMDs make such transmission.

Based on the received the sound-data stream, the VAS may identify a voice input comprising a voice utterance and may determine an intent of the voice utterance. In this regard, the VAS advantageously only has to process a sound-data stream from the media playback system and does not need to perform analyses related to remote arbitration, which may help to conserve the VAS's compute resources.

Thereafter, the VAS may determine the identity of the arbitrator NMD and send to the arbitrator NMD a message including VAS response data that is indicative of a given VAS response via the communication network.

The VAS may determine the identity of the arbitrator of the NMD in various different manners. According to an embodiment, the VAS may identify the arbitrator NMD via UPnP (Universal Plug 'n Play). As one example, UPnP eventing may be used to set the value of a state indicator that specifies the identity of the arbitrator NMD to the VAS. In practice, the group coordinator of a set of NMDs may be the arbitrator NMD. The VAS may determine the identity of the arbitrator NMD in various other manners as well.

After receiving the VAS response data that is indicative of a given VAS response, the arbitrator NMD outputs the VAS response. In this way, the media playback system exhibits a more predictable behavior that aligns with users' expectations.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
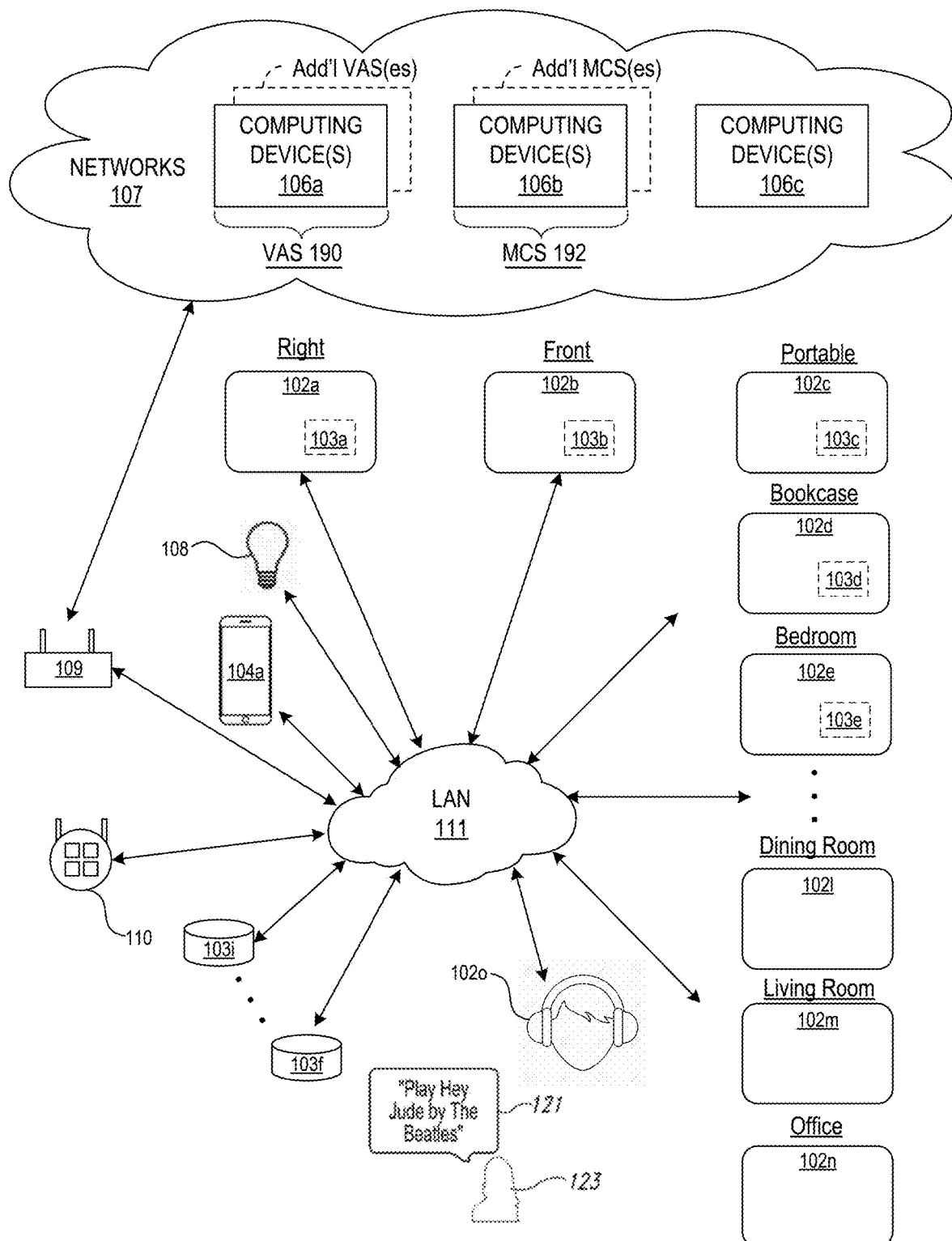
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 100, and a local computing device 105 (FIG. 1A). In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a LAN 101 including a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the LAN 101.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a—e include or are otherwise equipped with corresponding NMDs 103a—e, respectively. A playback device that includes or is equipped with an NMD may be referred to herein interchangeably as a playback device or an NMD unless indicated otherwise in the description.

In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the LAN 101 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the LAN 101 (FIG. 1B) may be eliminated and the single playback device 102 and/or the single NMD 103 may communicate directly with the remote computing devices 106a—d. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
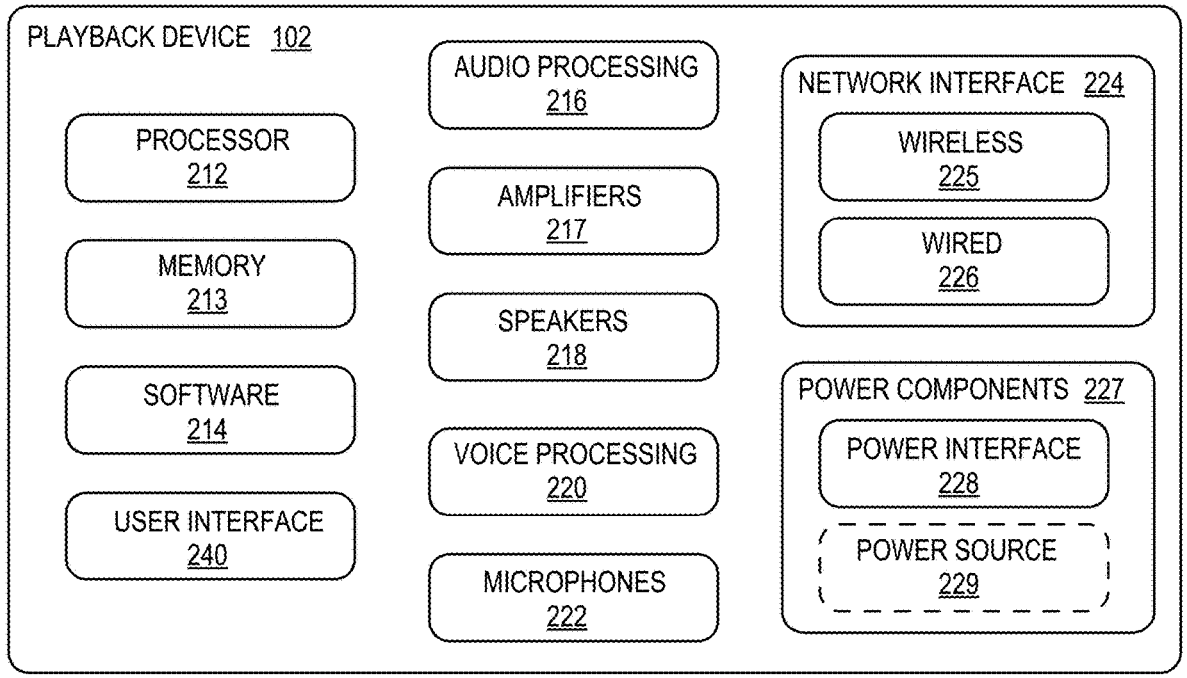
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 1002.11a, 1002.11b, 1002.11g, 1002.11n, 1002.11ac, 1002.15, 4G mobile communication standard, and so on). A wired interface may provide network interface functions for the playback device 102 to communicate over a wired connection with other devices in accordance with a communication protocol (e.g., IEEE 1002.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. patent application Ser. No. 15/438,749.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
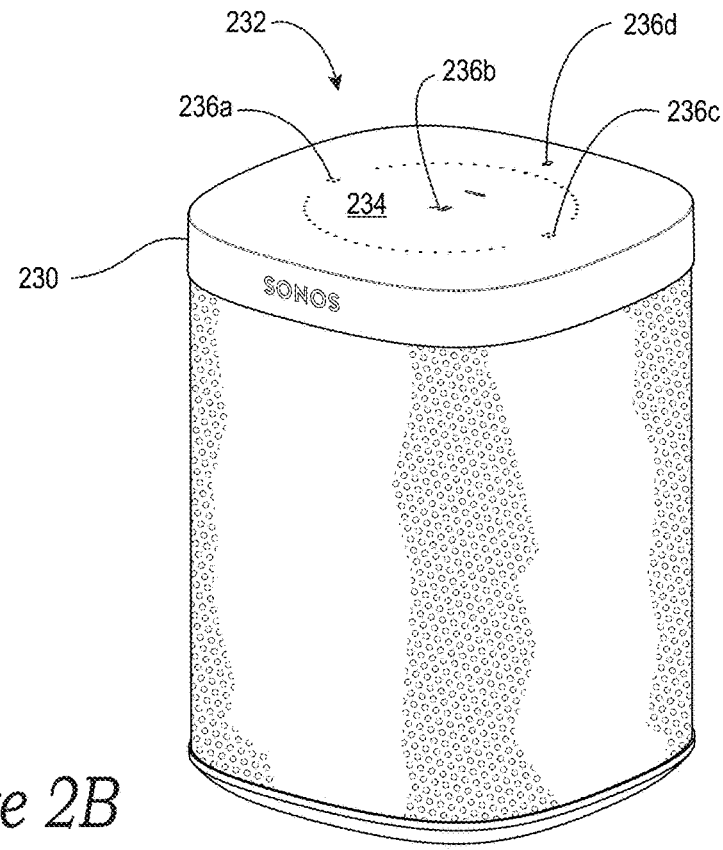
FIG. 2B is an isometric diagram of an example playback device that includes a network microphone device.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the media playback system 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

Figure 3B:
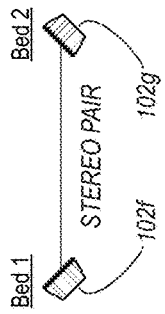
FIGS. 3A-3E are diagrams showing example playback device configurations in accordance with aspects of the disclosure.
Figure 3C:
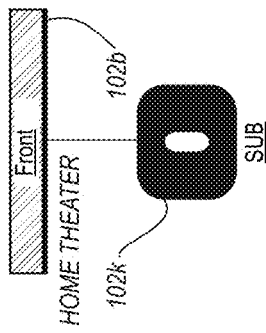
Figure 3D:
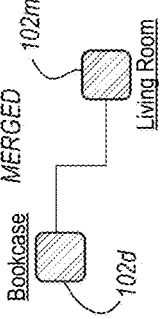
Figure 3E:
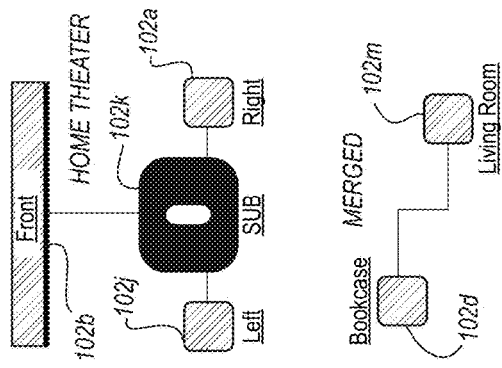
Figure 3A:
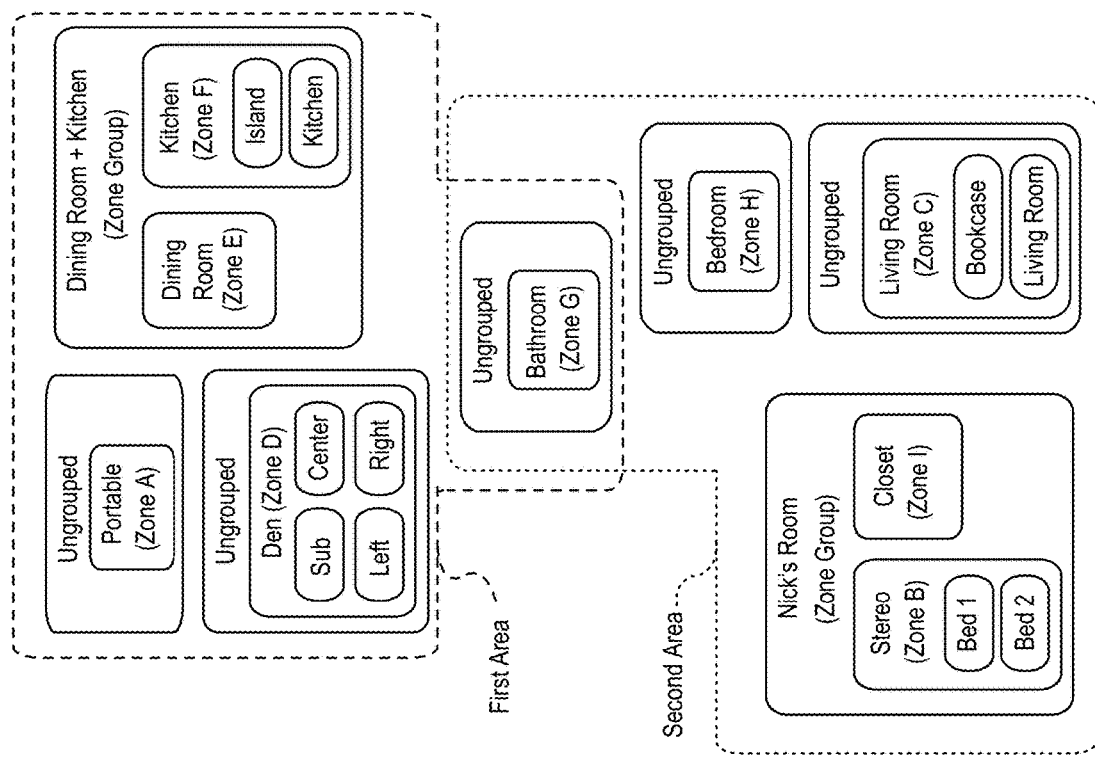

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair" which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 202 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102c. while another user may be preparing food in the Kitchen zone and listening to classical music being played by the playback device 102*i*. In another example, a playback zone may play the same audio content in synchrony with another playback zone. For instance, the user may be in the Office zone where the playback device 102*n* is playing the same hip-hop music that is being playing by playback device 102*c* in the Patio zone. In such a case, playback devices 102*c* and 102*n* may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102*c* from the Patio zone to the Office zone, the Office zone may now include both the playback devices 102*c* and 102*n*. In some cases, the user may pair or group the moved playback device 102*c* with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102*i* and 102*l* may render audio content in synchrony. As another example, bonded playback devices in the Den zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103*a* or 103*b* (FIG. 1B) to control the Den zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the MPS 100.

c. Example Controller Devices

FIG. 4A is a functional block diagram illustrating certain aspects of a selected one of the controller devices 104 of the MPS 100 of FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4A, the controller device 104 also includes a user interface 440 that is generally configured to facilitate user access and control of the MPS 100. The user interface 440 may include a touch-screen display or other physical interface configured to provide various graphical controller interfaces, such as the controller interfaces 440*a* and 440*b* shown in FIGS. 4B and 4C. Referring to FIGS. 4B and 4C together, the controller interfaces 440*a* and 440*b* includes a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via the controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

e. Example Network Microphone Devices

Figures 5, 6:
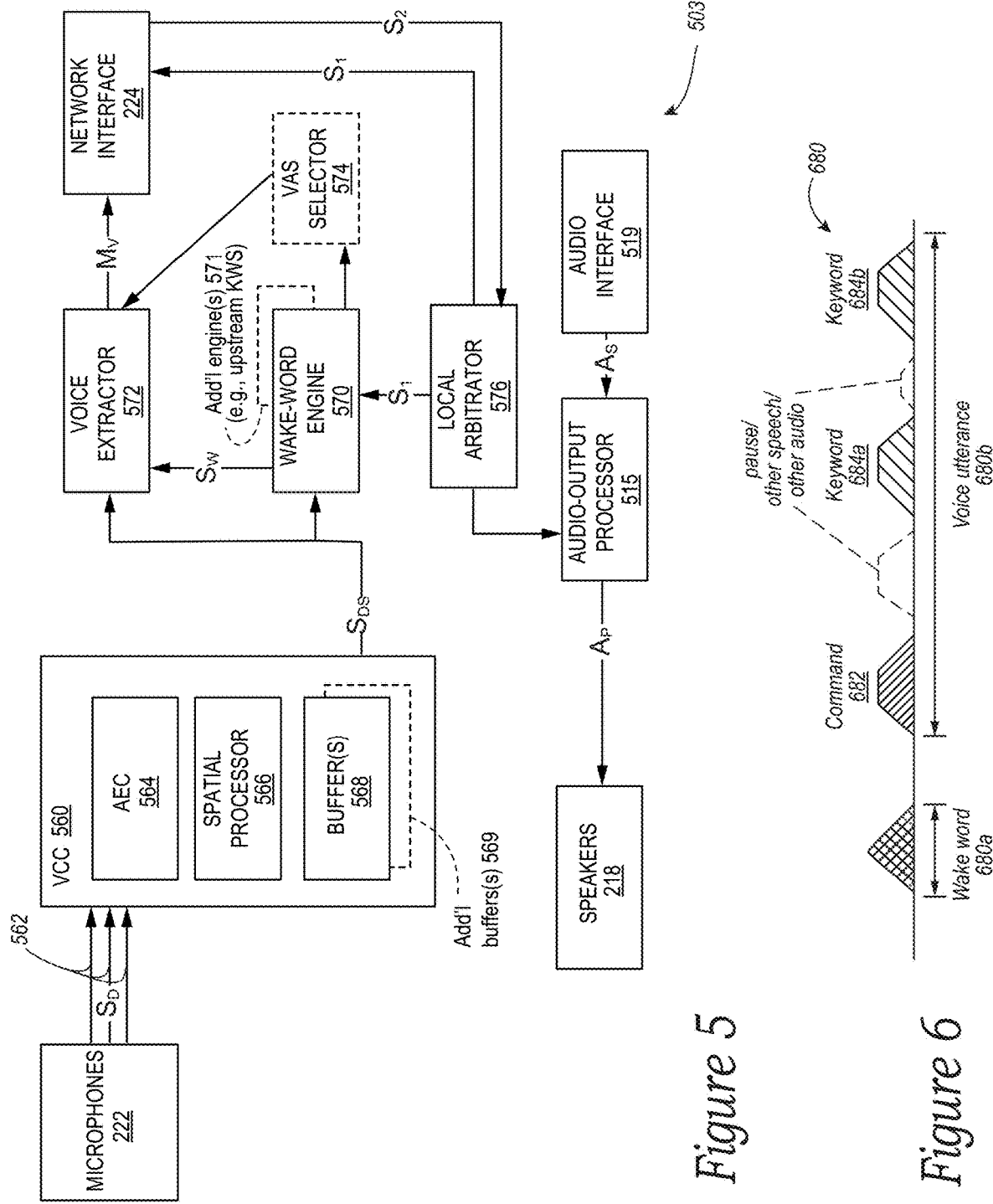
FIG. 5 is a functional block diagram of certain components of an example network microphone device in accordance with aspects of the disclosure.
FIG. 6 is a diagram of an example voice input in accordance with aspects of the disclosure.

FIG. 5 is a functional block diagram showing an NMD 503 configured in accordance with embodiments of the disclosure. The NMD 503 includes voice capture components ("VCC") 560; at least one wake-word engine 570 and at least one voice extractor 572, each of which is operably coupled to the VCC 560; and a local arbitrator 576, audio output processing components 515 operably coupled to the local arbitrator 576, and at least one audio input interface 519 operably coupled to the audio output processing components 515, both of which may form a portion of the audio processing components 216 discussed above. The NMD 503 further includes the microphones 222 and the at least one network interface 224 described above and may also include other components, such as audio amplifiers, speakers, a user interface, etc., which are not shown in FIG. 5 for purposes of clarity.

The microphones 222 of the NMD 503 are configured to provide detected sound, $S_D$, from the environment of the NMD 503 to the VCC 560. The detected sound $S_D$ may take the form of one or more analog or digital signals. In example implementations, the detected sound $S_D$ may be composed of a plurality signals associated with respective channels 562 that are fed to the VCC 560.

Each channel 562 may correspond to a particular microphone 222. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

As further shown in FIG. 5, the VCC 560 includes an AEC 564, a spatial processor 566, and one or more buffers 568. In operation, the AEC 564 receives the detected sound $S_D$ and filters or otherwise processes the sound to suppress echoes and/or to otherwise improve the quality of the detected sound $S_D$. That processed sound may then be passed to the spatial processor 566.

The spatial processor 566 is typically configured to analyze the detected sound $S_D$ and identify certain characteristics, such as a sound's amplitude (e.g., decibel level), frequency spectrum, directionality, etc. In one respect, the spatial processor 566 may help filter or suppress ambient noise in the detected sound $S_D$ from potential user speech based on similarities and differences in the constituent channels 562 of the detected sound $S_D$, as discussed above. As one possibility, the spatial processor 566 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 566 may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In operation, the one or more buffers 568—one or more of which may be part of or separate from the memory 213 (FIG. 2A)— capture data corresponding to the detected sound $S_D$. More specifically, the one or more buffers 568 capture detected-sound data that was processed by the upstream AEC 564 and spatial processor 566. In some implementations, the NMD 503 may include an additional buffer 569 (shown in dashed lines) that stores information (e.g., metadata or the like) regarding the detected sound $S_D$ that was processed by the upstream AEC 564 and spatial processor 566. This other buffer 569 may be referred to as a "sound metadata buffer." When the wake-word engine 570 identifies a wake-word trigger (discussed below), the sound metadata buffer 569 may pass to the network interface 224 sound characteristic information corresponding to the wake-word trigger (e.g., spectral and/or gain information of the environment of the NMD and/or the voice input comprising the wake word). The network interface 224 may then provide this information to a remote server that may be associated, e.g., with the MPS 100. In one aspect, the information stored in the additional buffer 569 does not reveal the content of any speech but instead is indicative of certain unique features of the detected sound itself. In a related aspect, the metadata may be communicated between computing devices, such as the various computing devices of the MPS 100 without implicating privacy concerns. In practice, the MPS 100 can use the data to adapt and fine-tune voice processing algorithms, including sensitivity tuning as discussed below.

In any event, the detected-sound data form a digital representation (i.e., sound-data stream), SDS, of the sound detected by the microphones 222. In practice, the sound-data stream SDS may take a variety of forms. As one possibility, the sound-data stream SDS may be composed of frames, each of which may include one or more sound samples. The frames may be streamed (i.e., read out) from the one or more buffers 568 for further processing by downstream components, such as the wake-word engine 570 and the voice extractor 572 of the NMD 503.

In some implementations, at least one buffer 568 captures detected-sound data utilizing a sliding window approach in which a given amount (i.e., a given window) of the most recently captured detected-sound data is retained in the at least one buffer 568 while older detected-sound data are overwritten when they fall outside of the window. For example, at least one buffer 568 may temporarily retain 20 frames of a sound specimen at given time, discard the oldest frame after an expiration time, and then capture a new frame, which is added to the 19 prior frames of the sound specimen.

In practice, when the sound-data stream SDS is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

In any case, downstream components of the NMD 503 may process the sound-data stream SDS. For instance, the wake-word engine 570 is configured to apply or more identification algorithms to the sound-data stream SDS (e.g., streamed sound frames) to spot potential wake words in the detected-sound $S_D$. When the wake-word engine 570 spots a potential wake word, the work-word engine 570 provides an indication of a "wake-word event" (also referred to as a "wake-word trigger"). In the illustrated example of FIG. 5, the wake-word engine 570 outputs a signal, $S_W$, that indicates the occurrence of a wake-word event to the voice extractor 572.

In multi-VAS implementations, the NMD 503 may include a VAS selector 574 (shown in dashed lines) that is generally configured to direct the voice extractor's extraction and transmission of the sound-data stream SDS to the appropriate VAS when a given wake-word is identified by a particular wake-word engine (and a corresponding wake-word trigger), such as the wake-word engine 570 and at least one additional wake-word engine 571 (shown in dashed lines). In such implementations, the NMD 503 may include multiple, different wake-word engines and/or voice extractors, each supported by a particular VAS. Similar to the discussion above, each wake-word engine may be configured to receive as input the sound-data stream SDS from the one or more buffers 568 and apply identification algorithms to cause a wake-word trigger for the appropriate VAS. Thus, as one example, the wake-word engine 570 may be configured to identify the wake word "Alexa" and cause the NMD 503 to invoke the AMAZON VAS when "Alexa" is spotted. As another example, the wake-word engine 571 may be configured to identify the wake word "Ok, Google" and cause the NMD 503 to invoke the GOOGLE VAS when "Ok, Google" is spotted. In single-VAS implementations, the VAS selector 574 may be omitted.

In response to the wake-word event (e.g., in response to the signal $S_W$ indicating the wake-word event), the voice extractor 572 is configured to receive and format (e.g., packetize) the sound-data stream SDS. For instance, the voice extractor 572 packetizes the frames of the sound-data stream SDS into messages.

After the voice extractor 572 packetizes the frames of the sound-data stream SDS into messages, the NMD 503 may perform some form of extraction. The extraction may take various forms which will now be described.

According to one implementation, referred to as "extraction" (and as opposed to "local extraction"), the voice extractor 572 transmits or streams these messages, $M_V$, that may contain voice input in real time or near real time to a remote VAS, such as the VAS 190 (FIG. 1B), via the network interface 224. The VAS 190 may receive the messages of the sound-data stream from NMD 503 and any other NMDs that have identified a same wake word based on a detected sound.

According to the local extraction implementation, the voice extractor 572 transmits or streams these messages, $M_V$, that may contain voice input in real time or near real time to local (e.g., playback or network microphone) device on the same local area network as NMD 503 via the network interface 224. The local device receives messages of the sound-data stream from NMD 503 and any other NMDs that have identified a same wake word based and performs arbitration by selecting the NMD that identified the given wake word with the highest confidence level.

In any case, The VAS is configured to process the sound-data stream SDS contained in the messages $M_V$ sent from the NMD 503. More specifically, the VAS is configured to identify voice input based on the sound-data stream SDS. Referring to FIG. 6, a voice input 680 may include a wake word portion 680a and a voice utterance portion 680b. The wake word portion 680a corresponds to detected sound that caused the wake-word event. For instance, the wake word portion 680a corresponds to detected sound that caused the wake-word engine 570 to output the wake word event signal $S_W$ to the voice extractor 572. The voice utterance portion 680b corresponds to detected sound that potentially comprises a user request following the wake-word portion 680a.

In the standard extraction implementation, the VAS may first process the wake word portion 680a within the sound-data stream SDS to verify the presence of the wake word. In some instances, the VAS may determine that the wake word portion 680a comprises a false wake word (e.g., the word "Election" when the word "Alexa" is the target wake word). In such an occurrence, the VAS may send a response to the NMD 503 (FIG. 5) with an indication for the NMD 503 to cease extraction of sound data, which may cause the voice extractor 572 to cease further streaming of the detected-sound data to the VAS. The wake-word engine 570 may resume or continue monitoring sound specimens until it spots another potential wake word, leading to another wake-word event. In some implementations, the VAS may not process or receive the wake word portion 680a but instead processes only the voice utterance portion 680b.

In any case, the VAS processes the voice utterance portion 680b to identify the presence of any words in the detected-sound data and to determine an underlying intent from these words. The words may correspond to a certain command and certain keywords 684 (identified individually in FIG. 6 as a first keyword 684a and a second keyword 684b). A keyword may be, for example, a word in the voice input 680 identifying a particular device or group in the MPS 100. For instance, in the illustrated example, the keywords 684 may be one or more words identifying one or more zones in which the music is to be played, such as the Living Room and the Dining Room (FIG. 1A). Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the voice utterance portion 680b may include additional information, such as detected pauses (e.g., periods of non-speech) between words spoken by a user, as shown in FIG. 6. The pauses may demarcate the locations of separate commands, keywords, or other information spoke by the user within the voice utterance portion 680b.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these devices (e.g., raise/lower volume, group/ungroup devices, etc.), turn on/off certain smart devices, among other actions. After receiving the response from the VAS, the wake-word engine 570 of the NMD 503 (FIG. 5) may resume or continue to monitor the sound-data stream SDS until it spots another potential wake-word, as discussed above.

NMD 503 may also include a local arbitrator 576. Local arbitrator 576 may configure the NMD 503 to take various roles, such an arbitrator-related role. In an implementation, local arbitrator 576 may configure an NMD to be either an arbitrator or a non-arbitrator. If the NMD is configured to be an arbitrator, the NMD may perform some or all arbitration functions related to selecting a particular NMD amongst multiple NMDs (including itself) as the device from which VAS responses will be output and the source device from which sound data will be extracted, for instance based on determining that the particular NMD identified a given wake word with the highest confidence level. If the NMD is not configured to be a non-arbitrator, the NMD may be configured not to perform the function of arbitration, and to defer the function of performing arbitration to a local device that is designated as an arbitrator and/or to a remote network device, such as a VAS that is configured to perform arbitration. Local arbitrator 576 may designate an NMD as an arbitrator or non-arbitrator in various manners, for instance based on the NMD's role, based on a selection by a user, etc.

Local arbitrator 576 may determine whether to designate an NMD as an arbitrator or non-arbitrator based on receiving one or more messages, such as UPnP eventing messages, as one example. Local arbitrator 576 may determine whether to designate an NMD as an arbitrator or non-arbitrator in various other manners as well.

Returning to FIG. 5, in general, the one or more identification algorithms that a particular wake-word engine, such as the wake-word engine 570, applies are configured to analyze certain characteristics of the detected sound stream SDS and compare those characteristics to corresponding characteristics of the particular wake-word engine's one or more particular wake words. For example, a particular wake-word engine 570 may apply one or more identification algorithms to spot spectral characteristics in the detected sound stream SDS that match the spectral characteristics of the engine's one or more wake words, and thereby determine that the detected sound $S_D$ comprises a voice input including a particular wake word.

In some implementations, the one or more identification algorithms may be third-party identification algorithms (i.e., developed by a company other than the company that provides the NMD 103). For instance, operators of a voice service (e.g., AMAZON) may make their respective algorithms (e.g., identification algorithms corresponding to AMAZON's ALEXA) available for use in third-party devices (e.g., NMDs 103), which are then trained to identify one or more wake words for the particular voice service. Additionally, or alternatively, the one or more identification algorithms may be first-party identification algorithms that are developed and trained to identify certain wake words that may not be particular to a given voice service. Other possibilities also exist.

In practice, a wake-word engine may include a sensitivity level setting that is modifiable. The sensitivity level may define a degree of similarity between a word identified in the detected sound stream SDS and the wake-word engine 570's one or more particular wake words that is considered to be a match (i.e., that triggers the NMD 103 to invoke the corresponding VAS). In other words, the sensitivity level defines how closely, as one example, the spectral characteristics in the detected sound stream SDS must match the spectral characteristics of the engine's one or more wake words to be a wake-word trigger.

In this respect, the sensitivity level generally controls how many false positives that the wake-word engine 570 identifies. For example, if a wake-word engine 570 is configured to identify the wake-word "Alexa" with a relatively high sensitivity, then false wake words of "Election" or "Lexus" would cause the wake-word engine 570 to flag the presence of the wake-word "Alexa." On the other hand, if this example wake-word engine 570 is configured with a relatively low sensitivity, then the false wake words of "Election" or "Lexus" would not cause the wake-word engine 570 to flag the presence of the wake-word "Alexa."

In practice, a sensitivity level may take a variety of forms. In example implementations, a sensitivity level takes the form of a confidence threshold that defines a minimum confidence (i.e., probability) level for a wake-word engine that serves as a dividing line between triggering or not triggering a wake-word event when the wake-word engine is analyzing detected sound for its particular wake word. In this regard, a higher sensitivity level corresponds to a lower confidence threshold (and more false positives), whereas a lower sensitivity level corresponds to a higher confidence threshold (and fewer false positives). For example, lowering a wake-word engine's confidence threshold configures it to trigger a wake-word event when it identifies words that have a lower likelihood that they are the actual particular wake word, whereas raising the confidence threshold configures the engine to trigger a wake-word event when it identifies words that have a higher likelihood that they are the actual particular wake word. Other examples of sensitivity levels are also possible.

In example implementations, sensitivity level parameters (e.g., the range of sensitivities) for a particular wake-word engine can be updated, which may occur in a variety of manners. As one possibility, a VAS or other third-party provider of a given wake-word engine may provide to the NMD 503 a wake-word engine update that modifies one or more sensitivity level parameters for the given wake-word engine.

As another possibility, a remote server associated with the MPS 100 may update (or define in the first instance) sensitivity level parameters for a given wake-word engine, which it may do periodically or aperiodically. In some such cases, the remote server may define or otherwise update sensitivity level parameters for wake-word engines based on data regarding characteristics of detected sound (e.g., spectral and/or gain characteristics) associated with past occurrences of wake-word triggers (i.e., identifications of the respective particular wake-words for the given engines). In practice, the remote server may receive such data from NMDs when wake-word triggers occur or from another source of wake-word related sound data (e.g., Internet databases or the like). In any case, the remote server may be configured to perform operations based on such data (e.g., train predictive models and/or run simulations) to determine sensitivity parameters for a given wake-word engine to balance false positives and true identifications of the particular wake word.

In example embodiments, a wake-word engine 570 may take a variety of forms. For example, a wake-word 570 may take the form of one or more modules that are stored in memory of the NMD 503 (e.g., the memory 213; FIG. 2A). As another example, a wake-word engine 570 may take the form of a general-purpose or special-purpose processor, or a module thereof. In this respect, multiple wake-word engines 570 may be part of the same component of the NMD 103 or each wake-word engine may take the form of a component that is dedicated for the particular wake-word engine. Other possibilities also exist. If a wake-word engine 570 identifies the presence of a wake word in the detected sound stream $S_D$, the wake-word trigger signal $S_W$ may be passed to the voice extractor 572 to begin extraction for processing voice input, as discussed above.

With reference still to FIG. 5, an NMD may be configured as a playback device that includes the at least one audio interface 519, as discussed above. The audio interface 519 is generally configured to receive audio in a variety of forms from a variety of sources (e.g., an analog music signal or digital data of an Internet podcast). In this regard, the audio interface 519 may take the form of an analog and/or digital line-in receptacle that physically connects the NMD 503 to an audio source and/or may take the form of, or otherwise leverage, the network interface 224. that receive audio data via a communication network. In any case, the audio interface 519 provides an audio stream, $A_S$, to the audio output processing components 515, which in turn process the audio stream $A_S$ prior to the NMD 103 outputting processed audio, $A_P$, via the speakers 218. In this respect, the audio output processing components 515 may be the same or similar to the audio processing components 218 discussed above.

In some embodiments, one or more of the components described above can operate in conjunction with the microphones 222 to detect and store a user's voice profile, which may be associated with a user account of the MPS 100. In some embodiments, voice profiles may be stored as and/or compared to variables stored in a set of command information or data table. The voice profile may include aspects of the tone or frequency of a user's voice and/or other unique aspects of the user, such as those described in previously-referenced U.S. patent application Ser. No. 15/438,749.

In some embodiments, one or more of the components described above can operate in conjunction with the microphones 222 to determine the location of a user in the home environment and/or relative to a location of one or more of the NMDs 103. Techniques for determining the location or proximity of a user may include one or more techniques disclosed in previously-referenced U.S. patent application Ser. No. 15/438,749, U.S. Pat. No. 9,084,058 filed Dec. 29, 2011, and titled "Sound Field Calibration Using Listener Localization," and U.S. Pat. No. 8,965,033 filed Aug. 31, 2012, and titled "Acoustic Optimization." Each of these applications is herein incorporated by reference in its entirety.

In some embodiments, the MPS 100 is configured to temporarily reduce the volume of audio content that it is playing while identifying the wake word portion 610 of a voice input. For instance, the MPS 100 may restore the volume after processing the voice input 600. Such a process can be referred to as ducking, examples of which are disclosed in previously-referenced U.S. patent application Ser. No. 15/438,749.

III. Example Local Arbitration and Designation of VAS Response Playback

Further examples of local arbitration and designation of a playback device to output a VAS response with will now be described in detail. As discussed above, multiple playback or NMDs devices may combined in various manners. For example, NMD-equipped playback devices 102 may be bonded to form a "bonded set." In a bonded set, a playback device may have a different playback responsibility than another playback device in the set. For instance, a first playback device of a bonded set may be responsible for audio playback of a left audio channel, and a second playback device may be responsible for playback of a right audio channel. An example of such a bonded set is shown and described above in connection with FIG. 3B. As another example of a bonded set, a third playback device of a bonded set may be responsible for playback of a center audio channel, such as the front playback device 102b, such as shown and described above in connection with FIGS. 3C and 3D. In some implementations, a left channel device (or alternatively a right channel device) in a stereo pair may be selected as the arbitrator NMD. In a similar fashion, one of a left, right, or center channel device may be selected as an arbitrator NMD in a home theater implementation.

In various implementations, implementing an arbitrator NMD in a bonded set may prevent the ping-pong effect. Further, an arbitrator NMD may conserve bandwidth by reducing the number of NMDs that communicate with a VAS when multiple NMDs identify a same wake word. In addition, or alternatively, an NMD may also be designated as the arbitrator NMD for a set of NMD-equipped playback devices comprising a group of playback devices in which none or only some of the playback devices are assigned a playback responsibility.

Turning to the example illustrated in FIG. 3D, front playback device 102b is bonded with SUB playback device 102k, and right and left playback devices 102a and 102j, respectively. In the examples now described, the playback devices 102a, 102b, and 102j are NMD-equipped playback devices and are referred to as playback devices for purposes of the following discussion. Also, while specific reference is made to FIG. 3D for the purpose of illustrating examples of arbitration and VAS response playback in the context bonded set, it should be understood that any of the techniques described herein may describe any configuration of bonded NMDs, playback zones comprised of multiple NMDs, or other media playback system configurations.

In the context of FIG. 3D, each of the NMD-equipped playback devices 102 in FIG. 3D may be configured to detect sound (i.e. audio waves) comprising ambient and/or background noise and which may also comprise speech intended to be processed by any of NMDs 102a, 102b, or 102j. The detected sound may be input into a voice capturing module, such as VCC 510 where the audio may undergo various types of pre-processing, spatial processing, etc., before buffers, such as buffers 568, and 569 capture data corresponding to the detected sound.

In example embodiments, at least one of the playback devices 102 may comprise a device, such as the arbitrator NMD, which may be the default NMD for outputting VAS responses in a set of NMDs. While the arbitrator NMD is described according to various examples as the default NMD for outputting VAS responses, it should be understood that devices other than the arbitrator NMD may also be designated as the default device for outputting VAS responses.

The arbitrator NMD may also be responsible for selecting which of NMDs 102 that is to extract detected-sound data for evaluation by a VAS. In some examples, the arbitrator NMD may be an NMD that has a greater amount of computational resources (e.g., processing power, memory, storage, etc.). In some examples, a device other than the arbitrator NMD may be configured to extract the detected-sound data.

For example, in some implementations, the arbitrator NMD may be assigned during the configuration of the media playback system that includes the two or more NMDs, which may be arranged as a bonded set. According to an implementation, UPnP eventing may be used to set the value of a state indicator that specifies the identity of the arbitrator NMD to a VAS and/or to other playback devices on a same network as the arbitrator NMD. A user may also manually specify the arbitrator NMD during the configuration of the media playback system. In some cases, the arbitrator responsibilities may be assigned to a given NMD in the set based on the NMD's role or hardware resources.

In some implementations, the arbitrator responsibilities may be assigned to a given NMD based on other considerations. For instance, the arbitrator responsibilities may be assigned to an NMD that has already been assigned other responsibilities within the media playback system. As one example, an NMD designated as the "group coordinator" that is responsible for facilitating synchronous playback of audio among the two or more NMDs may be assigned arbitrator responsibilities as well. As another example, an NMD designated as the "primary" device that is responsible for playing back a given audio channel, such as the center channel (e.g., playback device 102j) of a home theatre setup or either the left channel of a stereo pair setup, may also be assigned the arbitrator responsibilities.

In any case, in accordance with example embodiments provided herein, local arbitration may generally involve two or more NMD-equipped playback devices (e.g., NMD-equipped playback devices 102a, 102b, and 102j) of the media playback system identifying a particular wake word, the arbitrator NMD (e.g., NMD-equipped playback device 102b) selecting one of the NMD-equipped playback devices to extract detected-sound data that may include a voice input for evaluation by the VAS, and after evaluation of the detected-sound data by the VAS, the arbitrator NMD playing back a VAS response indicated by VAS response data generated by the VAS.

More specifically, in an example implementation, each non-arbitrator device (e.g., NMD-equipped playback devices 102b and 102j) NMD that identifies a particular wake word may transmit to the arbitrator NMD a notification that a wake word was identified. In some examples, a given notification may include a confidence level that the given non-arbitrator NMD identified the particular wake word correctly. In the case that an identifying NMD is the arbitrator NMD, the arbitrator NMD may not transmit a message that includes a confidence level but instead may generate an internal notification, which may include a confidence level that the arbitrator NMD identified the wake word correctly.

In practice, a confidence level may take various forms. For example, the confidence level may be metadata such as a metric calculated based on audio properties of the received wake word. Examples of some such metrics that may be used to calculate the confidence level may include a signal-to-noise ratio (SnR), a frequency spectrum of the identified wake word, a direction of the identified wake word, an amplitude (e.g., decibel level) of the identified wake word, etc. A confidence level may take various other forms as well.

In turn, the NMD-equipped playback device comprising the arbitrator NMD receives each of the notifications. Based on these notifications received, the arbitrator NMD may determine that more than one of the NMD-equipped playback devices 102 has identified the wake word at the same time. In response to this determination, the arbitrator NMD may next select which of the identifying NMDs is to extract the detected-sound data that may include a voice input for evaluation by the VAS. The arbitrator NMD may make this selection in various manners.

As one example, if the notifications include respective confidence levels in their identification of the wake word, the arbitrator NMD may select the NMD having the highest confidence level. For instance, if the NMD-equipped playback device 102a identifies the wake word with a higher confidence level than the arbitrator NMD, the arbitrator NMD may select that playback device over all other playback devices of the set. As another example, if the NMDs have differing roles, the arbitrator NMD 102b may use these roles as a basis for selecting which of the NMDs is to extract detected-sound data. For instance, if the NMD of NMD-equipped playback device 102j has a group coordinator role in the bonded set in FIG. 3D, the arbitrator NMD may select NMD 102j. Other examples of selecting the extraction NMD are also possible.

After selecting an NMD to extract the detected-sound data, the arbitrator NMD may cause the selected NMD to extract the detected-sound data that may include the voice input for evaluation by the VAS. In this respect, it should be understood that the extraction NMD may differ from, or be the same as, the arbitrator NMD that is designated to output a voice output. The process of causing the selected NMD to extract the detected-sound data may take various forms.

As one example, if the arbitrator NMD selects a non-arbitrator NMD such as the NMD-equipped playback device 102b, then the arbitrator NMD may send an instruction to this non-arbitrator NMD to extract the detected-sound data that may include a voice input for evaluation by the appropriate VAS. As another example, if the arbitrator NMD selects itself for extraction, then the arbitrator NMD 102b may trigger its internal voice capture components (e.g., VCC 510) to extract the detected-sound data for evaluation by the VAS.

After extracting the detected-sound data, the selected NMD may format the detected-sound data into a sound-data stream and transmit the sound-data stream containing at least the detected-voice data that may include a voice input (and perhaps also the wake word) to the VAS either directly via a communication network that couples the VAS and the media playback system or indirectly via the arbitrator NMD. In this respect, only one NMD or NMD-equipped playback device transmits a sound-data stream to the VAS, which consumes significantly less bandwidth than when multiple devices make such transmission.

After receiving the voice utterance of the voice input, the VAS may generate a VAS response that is based at least on the voice utterance of the voice input. In this regard, the VAS advantageously only has to process a single sound-data stream from the media playback system and does not need to perform analyses related to remote arbitration, which may help to conserve the VAS' compute resources.

Thereafter, the VAS may determine the identity of the arbitrator NMD 102*b* and send to the arbitrator NMD 102*b* a message including, or otherwise indicating, the VAS response via the communication network.

The VAS may determine the identity of the arbitrator NMD 102*b* in various different manners. According to an embodiment, the VAS may identify the arbitrator NMD 102*b* via UPNP. As one example, UPNP eventing may be used to set the value of a state indicator that specifies the identity of the arbitrator NMD 102*b* to the VAS. In practice, the group coordinator of a bonded set may be the arbitrator NMD. The VAS may determine the identity of the arbitrator NMD in various other manners as well.

After receiving the VAS response message, the arbitrator NMD outputs the VAS response. In this way, the media playback system exhibits a more predictable behavior that aligns with users' expectations. Outputting the VAS response may comprise playing back spoken words, audible tones, and/or various other forms of audio played back in response to a voice input. Outputting the VAS response may also take the form of outputting various visual signals such as one or more lights, outputting graphics on a display, etc. Some of these VAS responses may indicate whether the VAS and/or the NMD will perform a given action (e.g., begin music playback, output requested information, etc.) specified by the voice utterance of the voice input. VAS responses may take various other forms as well.

In line with the above discussion, and with reference to FIG. 5, the playback device 102*a* configured with components and functionality of an NMD 103 may include an audio output interface 530, a network interface 230, at least one processor (e.g. VCC 510, wake-word engine 520, etc.), and at least one microphone 224 each which is configured to detect sound.

IV. Example Use Cases

Figure 7A:
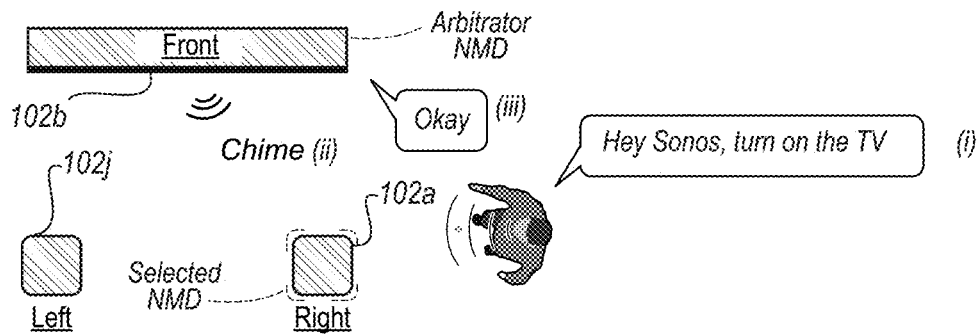
FIG. 7A is a conceptual diagram of an example network system configured in accordance with aspects of this disclosure.

Turning now to FIG. 7A, a conceptual diagram of an example set of NMD-equipped playback devices of a network system configured in accordance with aspects of this disclosure is depicted. The example depicted in FIG. 7A depicts a use case in a network media playback system is configured to perform localized arbitration and has a designated arbitrator NMD for at least a subset of playback devices of the media playback system.

The network media playback system depicted in FIG. 7A includes the right playback device 102*a*, the front playback device 102*b*, and the left playback device 102*j*, which may be collectively referred to as "playback devices 102." While playback devices 102 are described as being playback devices, some or all of playback devices 102 may also be or may include NMDs. In the network media playback system depicted in FIG. 7A, front playback device 102*b* is designated as the arbitrator NMD.

An example behavior of a set of NMD-equipped playback devices of a media playback system in response to a user speaking a voice input comprising a voice input comprising a wake word and a voice utterance will now be described in greater detail. In the illustrated example of FIG. 7A, the front playback device 102*b* is the arbitrator NMD.

In the example of FIG. 7A, the user speaks a wake word, such as "Hey Sonos," or another suitable wake word, such as "Hey Google" or "Alexa" which some or all of playback devices 102 may have detected. The wake word may have been followed by the voice utterance "Turn on the TV" (event "i"). In the illustrated example of FIG. 7A, the front playback device 102*b* outputs a confirmation, such as by playing a chime (event "ii"), indicating that the voice input was detected. In one aspect, the front playback device 102*b* is the only playback device in the set of playback devices 102 that plays the chime, including cases in which the front playback device 102*b* itself did not detect the voice input. In this example, each of the playback devices that detected the given wake word begin performing local extraction by sending data including a confidence level and sound-stream data captured by a given playback device to the arbitrator NMD, which is the front playback device 102*b*.

After receiving the confidence levels from each of the playback devices, the front playback device 102*b* selects the playback device which identified the given wake word with the highest confidence level, the right playback device 102*a* in this example, to perform local extraction. In some examples, the right playback device 102*a* may send instructions to cause the non-selected playback device 102*j* to cease performing local extraction. Playback device 102*b* may send an instruction to cause left playback device 102*a* to perform local extraction.

In any case, after selecting the right playback device 102*a* to perform local extraction, the front playback device 102*b* sends the extracted sound-data stream received from the right playback device 102*a* to a remote network device, such as VAS 190, which in turn determines the intent of the voice input included in the sound-data stream and sends voice output response data back to the arbitrator NMD, which is the front playback device 102*b* in this example.

In turn, the front playback device 102*b* generates a voice output response which may take the form of an audio or visual response based on the voice output response data received from VAS 190. In the example of FIG. 7A, the VAS response may take the form of an audio response, such as the word "Okay" (event "iii"). Finally, the arbitrator NMD, the front playback device 102*b*, outputs the VAS response via a speaker component of the front playback device 102*b*

Figure 7B:
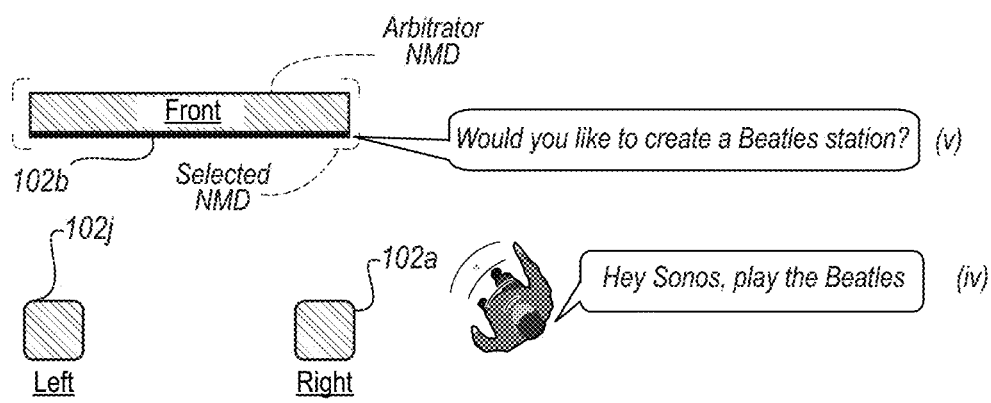
FIG. 7B is a conceptual diagram of an example network system configured in accordance with aspects of this disclosure.

Turning now to FIG. 7B, another conceptual diagram of an example set of NMD-equipped playback devices of a network system configured in accordance with aspects of this disclosure is depicted. The example depicted in FIG. 7B depicts a use case in which network media playback system is configured to perform localized arbitration and has a designated arbitrator NMD.

The network media playback system depicted in FIG. 7B includes the same playback devices 102 as illustrated in FIG. 7A. In the network media playback system depicted in FIG. 7B, the front playback device 102*b* may be designated as the arbitrator NMD. An example behavior of the media playback system depicted in FIG. 7B in response to a user speaking a voice input comprising a voice input comprising a wake word and a voice utterance will now be described.

In the example depicted in FIG. 7B, the user speaks a wake word, "Hey Sonos," or other suitable wake word, such as "Hey Google" or "Alexa" which some or all of playback devices 102 may have detected, followed by the voice utterance "Play the Beatles" (event "iv"). In this example, each of the playback devices that detected the given wake word begin performing local extraction by sending data including a confidence level and extracted sound-stream data captured by a given playback device to the arbitrator device, which is the front playback device 102b. The front playback device 102b may also play a chime (not shown) as described above, indicating that the voice input was detected.

After receiving the confidence levels from each of the playback devices, the front playback device 102b selects the playback device which detected the given wake word with the highest confidence level, which is the front playback device 102b itself in this example, to perform local extraction. In some examples, in addition to selecting itself to perform local extraction, the front playback device 102b may send instructions to cause non-selected playback devices 102a and 102j to cease performing local extraction.

In any case, after the front playback device 102b selects itself to perform local extraction, the front playback device 102b sends the sound-data stream extracted locally to a remote network device, such as VAS 190, which in turn determines the intent of the voice input included in the sound-data stream and sends VAS response data back to the arbitrator device, which is the front the playback device 102b.

In turn, the front playback device 102b generates a VAS response which may take the form of an audio or visual response based on the VAS response data received from VAS 190. In the example of FIG. 7B, the generated VAS may take a form of spoken audio such as "Would you like to create a Beatles station?" (event "v"). Finally, the arbitrator device, front playback device 102b, outputs the VAS response via speakers of the front playback device 102b.

Figure 8A:
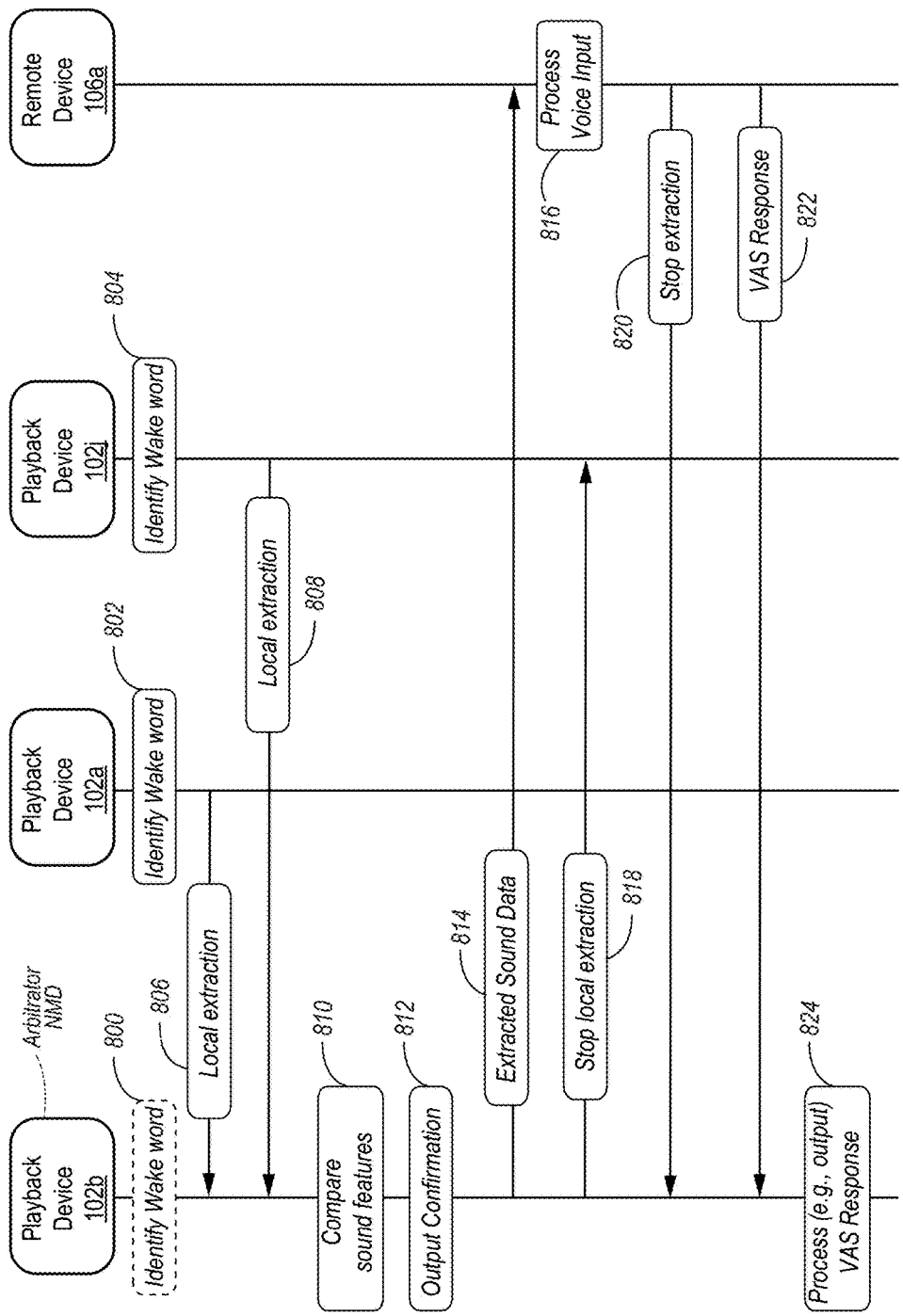
FIG. 8A is a message flow diagram for a network system configured to perform arbitration in accordance with aspects of the disclosure.
Figure 8B:
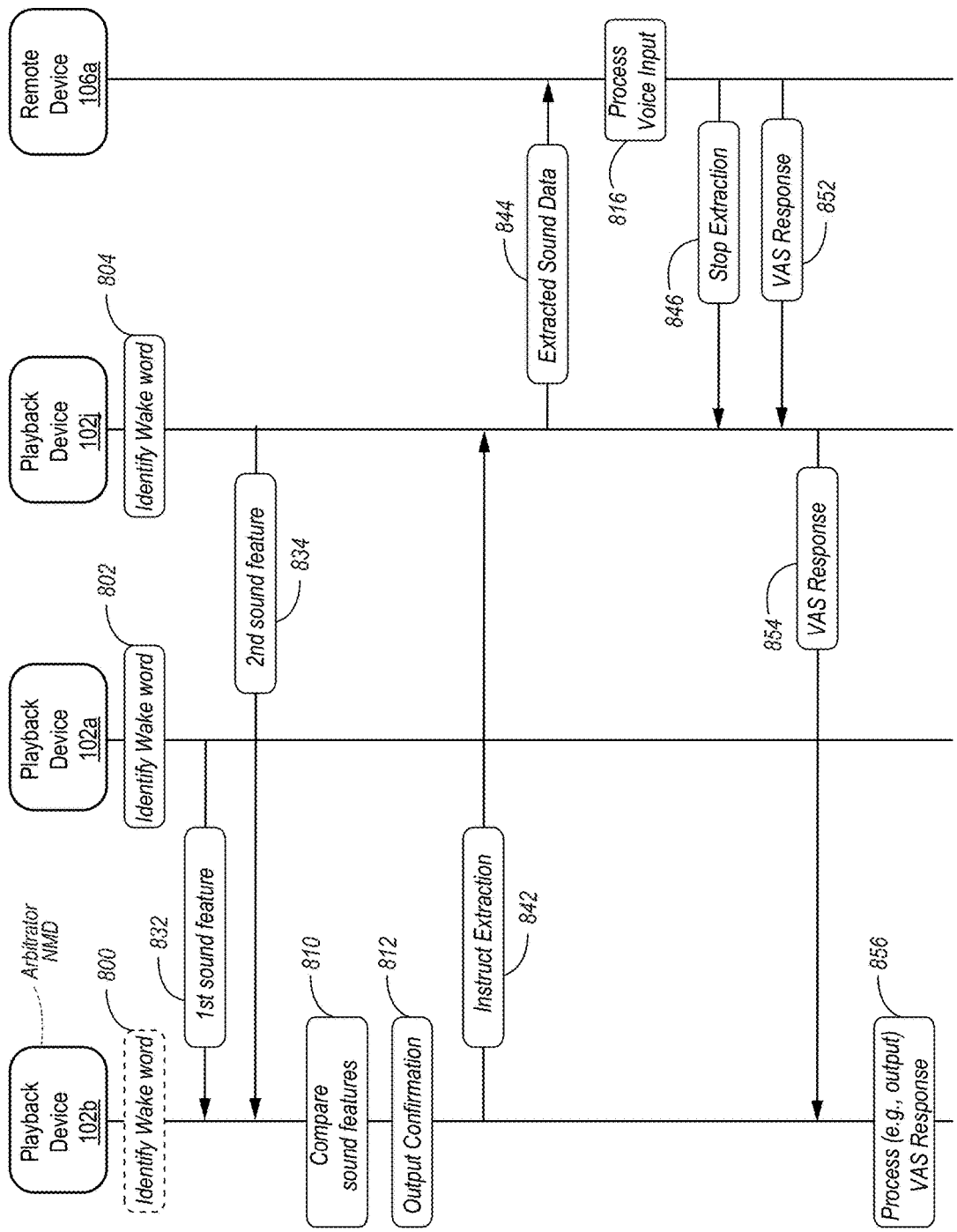
FIG. 8B is an example message flow diagram for a network system configured to perform arbitration in accordance with aspects of the disclosure.

Turning now to FIGS. 8A and 8B, example message flow diagrams for performing local arbitration between two or more playback devices in accordance with this disclosure are depicted. The message flow diagrams may correspond to implementations shown in one or both of FIGS. 7A and 7B. At a high level, FIG. 8A depicts a flow of data among NMD-equipped playback devices 102a, 102b, 102j, and a remote device 106a in which playback device 102b is the arbitrator NMD.

To begin the flow illustrated in FIG. 8A, each of playback devices 102a, and 102j may identify wake words 802 and 804, respectively. Also optionally, at block 800, the playback device 102b may also identify a same wake word as the playback devices 102a and 102j. After identifying wake words 802 and 804, at block 806, the playback device 102a may perform local extraction by sending sound features that are related to identifying the given wake word, and may be used to determine a confidence level, as well as an extracted sound-data stream to the playback device 102b. At block 808, the playback device 102j may also perform local extraction by sending metadata related to identifying the given wake word, such as a confidence level, as well as an extracted sound-data stream to the playback device 102b.

Next, at block 810, the playback device 102b may compare sound features (e.g., as part of performing arbitration), such as confidence levels included in the sound features received from the playback device 102a and the playback device 102j and may select the playback device that detected the given wake word with the highest confidence level, which in this example is playback device 102a.

In some examples, after selecting a playback device, the arbitrator NMD, in this case playback device 102b, may output a confirmation 812 to indicate to any users that playback device 102b is designated as the arbitrator NMD and as such users should expect playback device 102b to generate and output any VAS responses. Outputting a VAS response take various forms. As an example, the VAS response may take the form of an audio indication (e.g., a voice response) and/or visual indication that playback device 102b may output. Outputting a VAS response may take various other forms as well.

At block 814, the playback device 102b may transmit the extracted sound data, (e.g., an extracted sound-data stream) received from the selected playback device 102a to the remote device 106a. At block 816, the remote device 106a, which may comprise a VAS, may process the voice input included in the extracted sound data 814 received from playback device 102b.

At block 818, the playback device 102b may transmit an instruction to cause playback device 102j to stop local extraction 818 due to the playback device 102b selecting playback device 102a to perform local extraction rather than playback device 102j. While block 818 is illustrated as occurring after block 814 and block 816, block 818 may occur before or between either of these blocks as well.

At block 820, after receiving sufficient extracted sound data to process the voice input, remote device 106a may transmit message 820 to cause the playback device 102b to stop extraction. Playback device 102b may, in turn, send a message to the selected playback device 102a to cause the playback device 102a to stop performing local extraction (not pictured for the sake of clarity).

At block 822, the playback device 102b may receive VAS response data, and based on the received VAS response data, the playback device 102b may process (block 824) a VAS response, which may comprise outputting a VAS response, based on the received VAS response data.

Turning now to FIG. 8B, another example message flow diagram of performing arbitration between two or more playback devices in accordance with this disclosure is depicted. At a high level, FIG. 8B depicts a flow of data among the playback devices 102a, 102b, 102j, and the remote device 106a in which playback device 102b is an arbitrator NMD.

To begin the flow illustrated in FIG. 8B, at blocks 802 and 804, each of the playback devices 102a, and 102j may identify wake words. Also optionally, at block 800, the playback device 102b may also identify a same wake word as the playback devices 102a and 102j. Then, at block 832, after identifying the respective wake words at block 802 and 804, the playback device 102a may send a first sound feature of the first wake word by sending metadata related to identifying the given wake word, such as a confidence level, to the playback device 102b. At block 834, the playback device 102j may send a second sound feature by sending metadata related to identifying the given wake word, such as a confidence level, to the playback device 102b.

Next, at block 810, the playback device 102b may compare sound features, such as the received confidence levels included in the first and second sound features received from the playback device 102a and the playback device 102j, and optionally sound features detected by the playback device 102b itself, and may select the playback device that detected the given wake word with the highest confidence level, which may be the playback device 102j in the example of FIG. 8B In some examples, at block 812, after selecting a playback device, the arbitrator NMD, in this case the playback device 102b, may output a confirmation to indicate to any users that the playback device 102b is designated as the arbitrator NMD and as such, users should expect the playback device 102b to generate and output any VAS outputs. Outputting a confirmation may take various forms. As an example, the output confirmation may take the form of an audio indication (e.g., a voice response) and/or visual indication that the playback device 102b may output.

At block 842, the playback device 102b may transmit an instruction to cause the selected playback device 102j to begin performing extraction. In turn, at block 844, the playback device 102j may transmit extracted sound data, which may take the form of a sound-data stream, to the remote device 106a.

After the remote device 106a receives the extracted sound data, the remote device 106a may process the voice input 816 included in the extracted sound data received from the playback device 102j. Then, at block 846, after receiving sufficient extracted sound data to process the voice input, the remote device 106a may transmit a message to cause the playback device 102j to stop extraction.

Then, at block 852, remote device 106a may send a VAS response to the playback device 102j. Playback device 102j, in turn, transmits the VAS response data to the playback device 102b (block 854), which is designated as the arbitrator.

At block 856, the playback device 102b may receive VAS response data, and based on the received VAS response data, the playback device 102b may process (block 856) a VAS response, such as outputting a voice response, based on the received VAS response data.

In various implementations, the arbitrator NMD may also identify wake words as shown at block 800 in FIGS. 8A and 8B. In cases in which the arbitrator NMD determines that it has identified a wake word with the highest confidence level among one or more NMDs in a set, the arbitrator NMD may trigger its internal voice capture components to extract the detected-sound data for evaluation of a voice input by the VAS, while any of the other NMD(s) that were not selected do not extract their respective detected-sound data, such as in the manner described above.

In some implementations, NMDs and/or NMD-equipped playback devices may interact with one or more remote servers for remote arbitration between sets of devices (e.g., between two arbitrator NMDs of different sets of NMD-equipped playback devices) and/or between a set of devices and one or more NMDs that are not part of the set. In any case, each NMD that is configured to interact with the remote VAS for such arbitration may detect sound, capture detected-sound data in a respective buffer, identify the same wake word, and extract the detected-sound data that may include a voice input from the respective buffer. They may then send their respective extracted detected-sound data and voice inputs in the form of a detected-sound data stream to a VAS that determines which one NMD identified the wake word with a higher level of confidence.

Figure 9A:
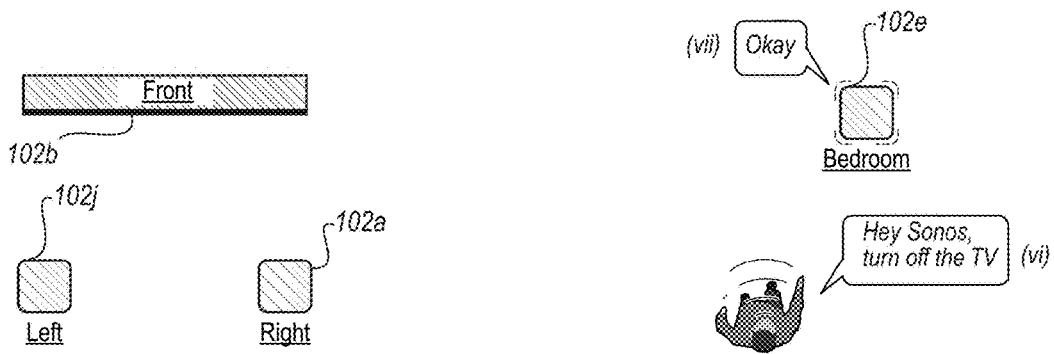
FIG. 9A is a conceptual diagram of an example network system configured in accordance with aspects of this disclosure.

Referring to FIG. 9A, another conceptual diagram of an example set of NMD-equipped playback devices of a network system configured in accordance with aspects of this disclosure is depicted. The example of FIG. 9A depicts a use case in a which network media playback system is configured to perform local arbitration for a bonded set that has a designated arbitrator NMD, and a VAS may be configured to perform subsequent remote arbitration between the local arbitrator NMD and the playback device 102e that is not part of bonded the set associated with the arbitrator NMD.

The network media playback system depicted in FIG. 9A includes a bonded set comprising playback devices 102a, 102b, and 102j. The network media playback system also includes the NMD-equipped playback device 102e that belongs to a "bedroom" zone group and that is not part of the set comprising the playback devices 102a, 102b, and 102j. The front playback device 102b may be designated as the arbitrator NMD for the bonded set, and a VAS may be configured to arbitrate between the playback device 102e belonging to the zone group and the bonded set comprising the playback devices 102a, 102b, and 102j.

An example behavior of media playback system in response to a user speaking a voice input comprising a voice input comprising a wake word and a voice utterance will now be described. In the example of FIG. 9A, the user speaks a wake word, "Hey Sonos," or other suitable wake word, such as "Hey Google" or "Alexa" which some or all of the playback devices 102 may have identified. The followed by the voice utterance "Turn off the TV" (event "vi"). In this example, each of the playback devices in the bonded set that identified the given wake word begin performing local extraction by sending data including a confidence level and sound-stream data captured by a given playback device to the arbitrator NMD, which is the front the playback device 102b.

After receiving the confidence levels from each of the playback devices, the front playback device 102b selects the playback device which detected the given wake word with the highest confidence level. As an example, the left playback device 102a may have detected the given wake word with the highest level, and consequently the front playback device 102b may select the left playback device 102j to perform local extraction for the bonded set and may transmit an extracted sound-data stream from the selected left playback device 102j to the VAS for arbitration and voice processing. In some examples, as a result of selecting the left playback device 102a to perform local extraction, the front playback device 102b may send instructions to cause the non-selected playback device 102j and itself, to cause them to cease performing local extraction.

In addition to the local arbitration performed by the bonded set, the playback device 102e from the Bedroom zone group also detects the given wake word and may perform extraction by sending data indicating a confidence level determined associated with the identifying the given wake word and sound-stream data captured by the playback device 102e to a VAS for arbitration and voice processing.

After the VAS receives the confidence levels from the selected playback devices, namely the playback device 102e of the Bedroom zone group and the left playback device 102j, the VAS performs arbitration by selecting the playback device from the Bedroom zone group or the bonded set that detects the given wake word with the highest confidence level. In this example, the playback device 102e of the Bedroom zone group detects the given wake word with the highest confidence level.

After selecting the playback device 102e, VAS 190 determines the intent of the voice input included in the extracted sound-data stream received from the playback device 102e and also sends voice output response data back to the selected device, which is the playback device 102e in this example. In some examples, VAS 190 may also send an instruction to cause the device a non-selected device, such as the left playback device 102*j* or the front playback device 102*b* and/or not to output a VAS response.

After the selected playback device 102*e* receives the voice output data, playback device 102*e* generates a VAS response which may take the form of an audio or visual response based on the voice output response data received from VAS 190. In the example of FIG. 9A, the generated voice output response may take the form of a VAS response such as "Okay" (event "vii"). Finally, the arbitrator NMD, the playback device 102*e* of the Zone group, an audio interface of the playback device 102*e* outputs a voice output response via speakers of the playback device 102*e*.

Figure 9B:
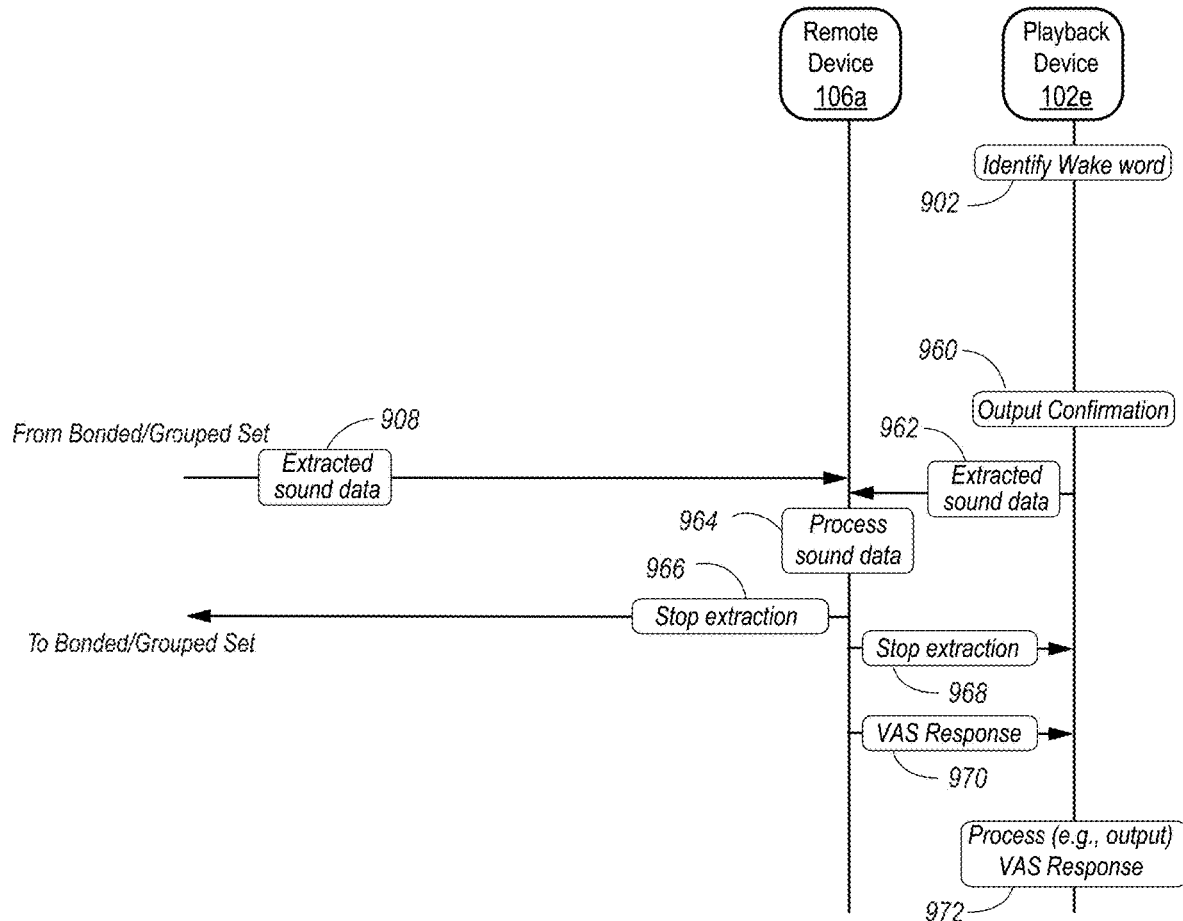
FIG. 9B is an example message flow diagram for a network system configured to perform arbitration in accordance with aspects of the disclosure.

Turning now to FIG. 9B, another example message flow of performing local arbitration between two or more playback devices followed by remote arbitration with one or more additional playback devices in accordance with this disclosure is depicted. At a high level, FIG. 9B depicts an extracted sound stream provided to the remote device 106*a*. FIG. 9B may be one example among others of messages exchanged during the implementation depicted in FIG. 9A.

To begin the flow illustrated in FIG. 9B, at block 902 the playback device 102*e* identifies a wake word. Additionally, one or more of the playback devices 102*a*, 102*b*, and 102*j* (not shown) has identified the wake word, and the local arbitrator of that set of devices may initiate extraction, such as in a manner described above. For example, the playback device 102*a* may perform local extraction by sending extracted sound data to playback device 102*b*, which ultimately extracts the detected sound data to the remote VAS, as shown at block 908.

At block 960, and after identifying the wake word at block 902, the playback device 102*e* may also output a confirmation, which may be similar to the confirmation output by the playback device 102*b*. At block 962, the playback device 102*e* may transmit its own locally-extracted sound data, which may take the form of metadata that may include sound features that may define a confidence level, as well as an extracted sound-data stream, to the remote device 106*a* for arbitration.

At block 964, after receiving extracted sound data from the playback device 102*e* and the bonded set of playback devices, the remote device 106*a* may processes the received extracted sound data. Processing the extracted sound data further includes processing the voice input included in the extracted sound data received from the playback device 102*b* that identified the given wake word with the highest confidence level. Additionally, block 964 may include the remote device 106*a* performing arbitration between the playback device 102*e* and the arbitrator NMD (the NMD-equipped playback device 102*b*, not pictured) of the bonded set of playback devices. More particularly in the example of FIG. 9B, to perform arbitration, the remote device 106*a* may select the playback device from either the zone group that includes the playback device 102*e* or the bonded set that includes the playback devices 102*a*, 102*b*, and 102*j* that identified the given wake word with the highest confidence level, which in this example is the playback device 102*e*. Upon selecting the playback device 102*e*, the remote device 106*a* may send an instruction to stop extraction from non-selected device(s), such as shown at block 966, upon the remote device 106*a* selecting the playback device 102*e* over the set of the playback devices 102*a*, 102*b*, and 102*j*.

At block 968, after receiving sufficient extracted sound data to process the voice input, the remote device 106*a* may transmit a message to cause the playback device 102*e* to stop extraction. Then, at block 970, remote device 106*a* may send VAS response data to the playback device 102*e*.

Finally, at block 972, the playback device 102*e* may receive the VAS response data, and based on the received VAS response data, may process (e.g., output) a VAS response based on the received VAS response data.

As another example, if the remote device 106*a* determines that the bonded set of playback devices detected the wake word with a higher confidence level than the playback device 102*e*, the remote device 106*a* can process extracted sound data that it receives from the bonded set (and cease extraction from the playback device 102*e*). The remote device 106*a* can then provide a VAS response to the arbitrator NMD, as described above.

V. Example Local Arbitration and Output Designation Flow Diagram

Figure 10:
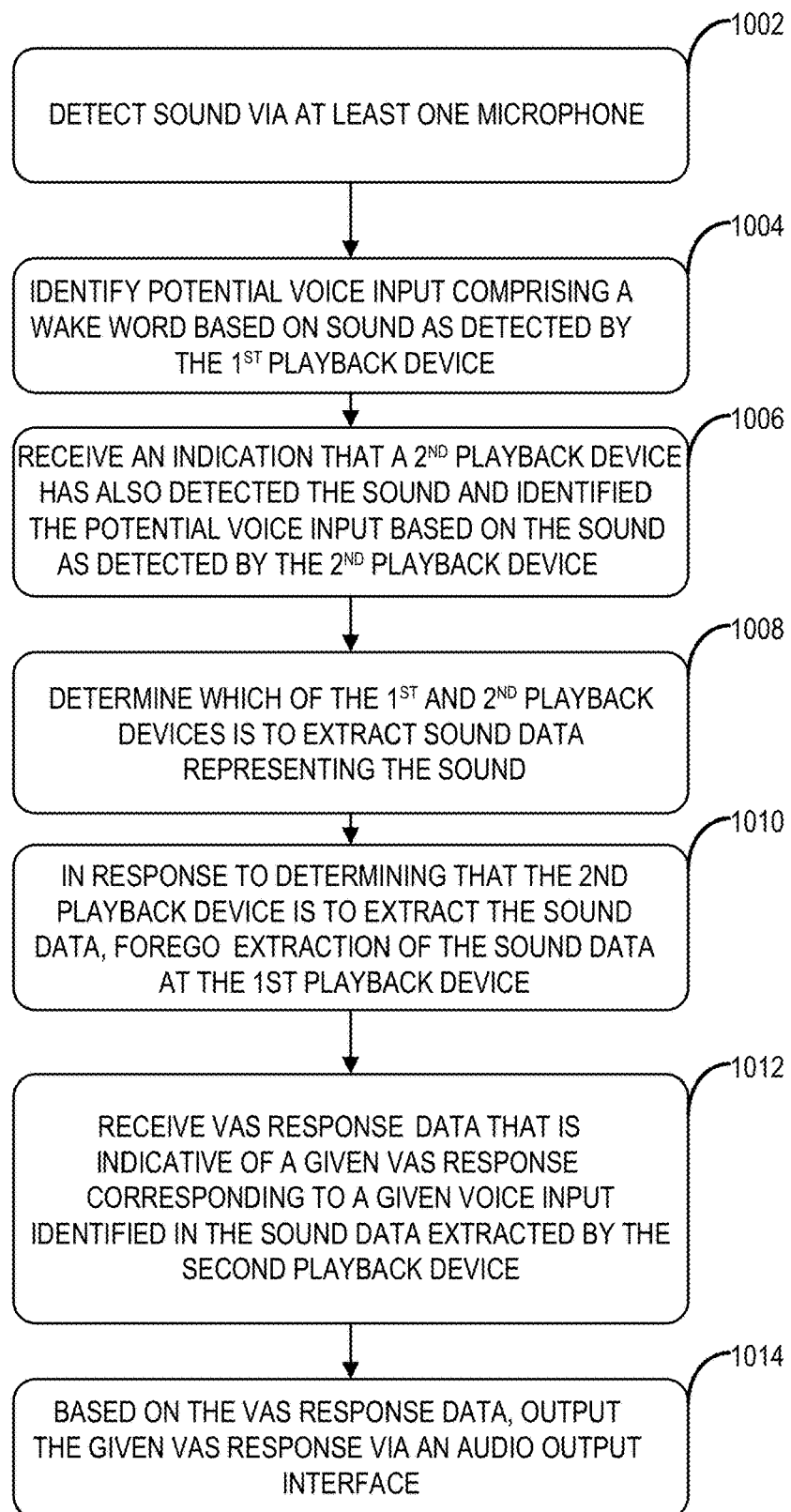
FIG. 10 is a flow diagram of an example method for performing local arbitration and designating voice output playback in accordance with aspects of the disclosure.

For purposes of illustration only, an example method 1000 for locally arbitrating between two or more playback devices in accordance with this disclosure is depicted in FIG. 10 and discussed below as being carried out by a playback device of the MPS 100 that is configured with a designated arbitrator NMD, such as one of the right or left playback devices of FIG. 3B or one of the right, left, or front playback devices of FIG. 3D. However, it should be understood that the method 1000 is merely exemplary. For instance, one or more blocks shown in the flow diagram of FIG. 10 may be rearranged into different orders, combined into fewer blocks, separated into additional blocks, and/or removed altogether. It should further be understood that the method 1000 could be performed by a device other than a playback device of the MPS 100, which may be part of a different type of system.

Turning now to FIG. 10, at block 1002, a first playback device equipped with an arbitrator NMD may detect sound via the at least one microphone 222.

At block 1004, the first playback device may identify a wake word based on the detected sound. The first playback device may identify the wake word based on the detected sound from a notification generated by the playback device or received from a second playback device, i.e., a non-arbitrating playback device.

At block 1006, the first playback device may receive, via the network interface 224, an indication that the second playback device, which may be in a bonded set or group with the first playback device, has also detected the sound and identified the wake word based on the sound as detected by the other playback device At block 1008, after receiving the indication, the first playback device may evaluate which of the playback devices in a set or group of devices is to extract sound data representing the sound. In the illustrated exampled depicted in FIG. 10, the first playback devices determines that the extraction of the sound data is to be performed by the second playback device over the first playback device.

At block 1010, in response to determining that the second playback device is to extract the sound data, the first playback device may forego extraction of the sound data at the first playback device. In some embodiments, the first playback device may then forward the extracted sound data of the second playback device to the VAS, while in other embodiments, the second playback device may directly transmit the extracted sound data to the VAS without forwarding the sound data to the first playback device, as discussed above.

At block 1012, the first playback device may receive, via the network interface 224 and from a network-based system configured to evaluate sound data for voice input and determine a corresponding VAS response (e.g., VAS 190), VAS response data that is indicative of a given VAS response corresponding to a given voice input identified in the sound data extracted by the second playback device.

Then, at block 1014, based on the VAS response data, the first playback device may output the given VAS response via one or more interfaces, such audio output interface 519, a visual interface or in various other manners.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. For example, in some implementations the arbitrator NMD may be configured to disregard some or all other NMDs in a set of bonded devices, such as by disabling wake-word detection on some or all of the NMDs in the set (e.g., to mitigate or further mitigate a ping-pong effect). In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A computer-implemented method comprising: detecting sound via at least one microphone, identifying a wake word based on the sound as detected by a first playback device, receiving, via a network interface, an indication that a second playback device has also detected the sound and identified the wake word based on the sound as detected by the second playback device, after receiving the indication, evaluating which of the first and second playback devices is to extract sound data representing the sound and thereby determining that the extraction of the sound data is to be performed by the second playback device over the first playback device, in response to the determining, foregoing extraction of the sound data at the first playback device, receiving, via the network interface from a network-based system that is configured to evaluate sound data for voice input and determine a corresponding VAS (Voice Assistant Service) response, VAS response data that is indicative of a given VAS response corresponding to a given voice input identified in the sound data extracted by the second playback device, and based on the VAS response data, playing back the given VAS response via an audio output interface.

Example 2: the computer-implemented method of claim 1, wherein identifying the wake word based on the sound as detected by the first playback device triggers the first playback device to determine a first feature of the sound as detected by the first playback device, wherein the indication that the second playback device has also detected the sound and identified the wake word based on the sound as detected by the second playback device comprises an indication of a second feature of the sound as detected by the second playback device, and wherein evaluating which of the first and second playback devices is to extract the sound data comprises comparing the first feature to the second feature.

Example 3: the computer-implemented method of any combination of Examples 1-2, wherein the first feature comprises a first signal-to-noise ratio of the sound as detected by the first playback device, and wherein the second feature comprises a second signal-to-noise ratio of the sound as detected by the second playback device.

Example 4: The computer-implemented method of any combination of Examples 1-3, in response to the determining, instructing the second playback device to perform the extraction of the sound data.

Example 5: The computer-implemented method of any combination of Examples 1-4, wherein the extraction of the sound data involves transmission of the sound data to the network-based system.

Example 6: The computer-implemented method of any combination of Examples 1-5, further comprising: receiving the sound data from the second playback device via the network interface, and transmitting the received sound data to the network-based system via the network interface.

Example 7: The computer-implemented method of any combination of Examples 1-6, further comprising: detecting a second sound via the at least one microphone, identifying the wake word based on the second sound as detected by the first playback device, receiving, via the network interface, a second indication that the second playback device has also detected the second sound and identified the wake word based on the second sound as detected by the second playback device, after receiving the second indication, evaluating which of the first and second playback devices is to extract second sound data representing the second sound and thereby determining that the extraction of the second sound data is to be performed by the first playback device over the second playback device, begin to perform the extraction of the second sound data, and thereafter cease the extraction of the second sound data in response to receiving an indication that the network-based system has selected a third playback device to extract the second sound data.

Example 8: The computer-implemented method of any combination of examples 1-7, wherein the first playback device and the second playback device are members of a bonded set, and wherein the third playback device is not a member of the bonded set.

Example 9: The computer-implemented method of any combination of examples 1-8, wherein the VAS response data comprises at least one of (a) a data representation of the given VAS response or (b) an identifier of the given VAS response.

Example 10: A first playback device, comprising: at least one microphone, an audio output interface, a network interface, at least one processor, a non-transitory computer-readable medium; and program instructions stored on the non-transitory computer-readable medium that, when executed by the at least one processor, cause the first playback device to perform functions comprising: any combination of Examples 1-9.

Example 11: A tangible, non-transitory, computer-readable medium having instructions stored thereon that are executable by one or more processors to cause a first playback device to perform operations comprising: any combination of Examples 1-10.

The invention claimed is:

1. A system comprising:
   at least one processor;
   at least one non-transitory computer-readable medium; and
   program instructions stored on the at least one non-transitory computer-readable medium that are executable by the at least one processor such that the system is configured to:
      cause two or more playback devices to form a first arbitration group, wherein each playback device of the first arbitration group has detected first sound and identified a wake word based on the first sound as detected by the respective playback device;
      evaluate which playback device of the first arbitration group is to respond to voice input included in the first sound;
      based on the evaluation, determine a given playback device of the first arbitration group that is to respond to the voice input included in the first sound;
      based on the determination, cause the given playback device to (i) be designated as a default response device of the first arbitration group and (ii) respond to the voice input included in the first sound;
      cause the two or more playback devices to leave the first arbitration group;
      after causing the two or more playback devices to leave the first arbitration group, cause the two or more playback devices to form a second arbitration group, wherein each playback device in the second arbitration group has detected second sound and identified a wake word based on the second sound as detected by the respective playback device;
      evaluate which playback device of the second arbitration group is to respond to voice input included in the second sound; and
      based on the evaluation, cause a given playback device of the second arbitration group to be designated as a default response device of the second arbitration group.

2. The system of claim 1, wherein the program instructions that are executable by the at least one processor such that the system is configured to evaluate which playback device of the first arbitration group is to respond to the voice input included in the first sound comprise program instructions that are executable by the at least one processor such that the system is configured to:
   determine a respective feature of the first sound as detected by each respective playback device of the first arbitration group;
   compare the respective features of the two or more playback devices of the first arbitration group; and
   based on the comparison, determine the given playback device is to respond to the voice input included in the first sound.

3. The system of claim 2, wherein the respective features of the first sound comprise respective signal-to-noise ratios of the first sound as detected by the two or more playback devices of the first arbitration group.

4. The system of claim 2, wherein the respective features of the first sound comprise respective confidence levels of the first sound as detected by the two or more playback devices of the first arbitration group.

5. The system of claim 1, wherein the program instructions that are executable by the at least one processor such that the system is configured to cause the given playback device to respond to the voice input included in the first sound comprise program instructions that are executable by the at least one processor such that the system is configured to:
   cause the given playback device of the first arbitration group to (i) extract, from the first sound, sound data comprising the voice input, (ii) process the extracted sound data and thereby determine a VAS response, and (iii) output the VAS response via an audio output interface of the given playback device.

6. The system of claim 5, wherein the program instructions that are executable by the at least one processor such that the system is configured to process the extracted sound data and thereby determine the VAS response comprise program instructions that are executable by the at least one processor such that the system is configured to:
   transmit the extracted sound data to a network-based system that is configured to evaluate sound data for voice input and determine a corresponding VAS response; and
   receive, from the network-based system, VAS response data that is indicative of the VAS response corresponding to the voice input included in the extracted sound data.

7. The system of claim 1, wherein the program instructions that are executable by the at least one processor such that the system is configured to cause the given playback device to be designated as the default response device of the first arbitration group comprise program instructions that are executable by the at least one processor such that the system is configured to:
   cause the given playback device of the first arbitration group to respond to any new voice inputs included in any new sound detected by any playback device of the first arbitration group within a given period of time.

8. The system of claim 1, further comprising program instructions stored on the at least one non-transitory computer-readable medium that are executable by the at least one processor such that the system is configured to:
   cause the two or more playback devices of the first arbitration group to continue to detect for new sound for a given period of time,
   wherein the program instructions that are executable by the at least one processor such that the system is configured to cause the two or more playback devices to leave the first arbitration group comprise program instructions that are executable by the at least one processor such that the system is configured to:
after the given period of time has lapsed and no new sound has been detected, cause the two or more playback devices to leave the first arbitration group.

9. The system of claim 1, wherein the given playback device of the first arbitration group that is to respond to the voice input included in the first sound is the given playback device of the second arbitration group that is to respond to the voice input included in the second sound.

10. The system of claim 1, wherein the first arbitration group comprises a first set of two or more playback devices of a media playback system, and the second arbitration group comprises a second set of two or more playback devices of the media playback system that is different from the first set.

11. At least one non-transitory computer-readable medium, wherein the at least one non-transitory computer-readable medium is provisioned with program instructions that, when executed by at least one processor, cause a system to:
cause two or more playback devices to form a first arbitration group, wherein each playback device of the first arbitration group has detected first sound and identified a wake word based on the first sound as detected by the respective playback device;
evaluate which playback device of the first arbitration group is to respond to voice input included in the first sound;
based on the evaluation, determine a given playback device of the first arbitration group that is to respond to the voice input included in the first sound;
based on the determination, cause the given playback device to (i) be designated as a default response device of the first arbitration group and (ii) respond to the voice input included in the first sound;
cause the two or more playback devices to leave the first arbitration group;
after causing the two or more playback devices to leave the first arbitration group, cause the two or more playback devices to form a second arbitration group, wherein each playback device in the second arbitration group has detected second sound and identified a wake word based on the second sound as detected by the respective playback device;
evaluate which playback device of the second arbitration group is to respond to voice input included in the second sound; and
based on the evaluation, cause a given playback device of the second arbitration group to be designated as a default response device of the second arbitration group.

12. The at least one non-transitory computer-readable medium of claim 11, wherein the program instructions that, when executed by at least one processor, cause the system to evaluate which playback device of the first arbitration group is to respond to the voice input included in the first sound comprise program instructions that, when executed by at least one processor, cause the system to:
determine a respective feature of the first sound as detected by each respective playback device of the first arbitration group;
compare the respective features of the two or more playback devices of the first arbitration group; and
based on the comparison, determine the given playback device is to respond to the voice input included in the first sound.

13. The at least one non-transitory computer-readable medium of claim 12, wherein the respective features of the first sound comprise respective signal-to-noise ratios of the first sound as detected by the two or more playback devices of the first arbitration group.

14. The at least one non-transitory computer-readable medium of claim 12, wherein the respective features of the first sound comprise respective confidence levels of the first sound as detected by the two or more playback devices of the first arbitration group.

15. The at least one non-transitory computer-readable medium of claim 11, wherein the program instructions that, when executed by at least one processor, cause the system to cause the given playback device to respond to the voice input included in the first sound comprise program instructions that, when executed by at least one processor, cause the system to:
cause the given playback device of the first arbitration group to (i) extract, from the first sound, sound data comprising the voice input, (ii) process the extracted sound data and thereby determine a VAS response, and (iii) output the VAS response via an audio output interface of the given playback device.

16. The at least one non-transitory computer-readable medium of claim 11, wherein the program instructions that, when executed by at least one processor, cause the system to cause the given playback device to be designated as the default response device of the first arbitration group comprise program instructions that, when executed by at least one processor, cause the system to:
cause the given playback device of the first arbitration group to respond to any new voice inputs included in any new sound detected by any playback device of the first arbitration group within a given period of time.

17. The at least one non-transitory computer-readable medium of claim 11, wherein the at least one non-transitory computer-readable medium is also provisioned with program instructions that, when executed by at least one processor, cause a system to:
cause the two or more playback devices of the first arbitration group to continue to detect for new sound for a given period of time,
wherein the program instructions that, when executed by at least one processor, cause the system to cause the two or more playback devices to leave the first arbitration group comprise program instructions that, when executed by at least one processor, cause the system to:
after the given period of time has lapsed and no new sound has been detected, cause the two or more playback devices to leave the first arbitration group.

18. A method carried out by a system, the method comprising:
causing two or more playback devices to form a first arbitration group, wherein each playback device of the first arbitration group has detected first sound and identified a wake word based on the first sound as detected by the respective playback device;
evaluating which playback device of the first arbitration group is to respond to voice input included in the first sound;
based on the evaluation, determining a given playback device of the first arbitration group that is to respond to the voice input included in the first sound;
based on the determination, causing the given playback device to (i) be designated as a default response device of the first arbitration group and (ii) respond to the voice input included in the first sound;

causing the two or more playback devices to leave the first arbitration group;

after causing the two or more playback devices to leave the first arbitration group, causing the two or more playback devices to form a second arbitration group, wherein each playback device in the second arbitration group has detected second sound and identified a wake word based on the second sound as detected by the respective playback device;

evaluating which playback device of the second arbitration group is to respond to voice input included in the second sound; and based on the evaluation, causing a given playback device of the second arbitration group to be designated as a default response device of the second arbitration group.

19. The method of claim 18, further comprising:

determining a respective feature of the first sound as detected by each respective playback device of the first arbitration group;

comparing the respective features of the two or more playback devices of the first arbitration group; and based on the comparison, determining the given playback device is to respond to the voice input included in the first sound.

20. The method of claim 18, wherein causing the given playback device to be designated as the default response device of the first arbitration group comprises:

causing the given playback device of the first arbitration group to respond to any new voice inputs included in any new sound detected by any playback device of the first arbitration group within a given period of time.

* * * * *